United States Patent [19]
Meister et al.

[11] Patent Number: 6,013,774
[45] Date of Patent: Jan. 11, 2000

[54] BIODEGRADABLE PLASTICS AND COMPOSITES FROM WOOD

[76] Inventors: John J. Meister, 31675 Westlady Rd., Beverly Hills, Mich. 48025; Meng-Jiu Chen, 901 St. Louis, Apt. #25, Ferndale, Mich. 48220

[21] Appl. No.: 09/162,986

[22] Filed: Sep. 29, 1998

Related U.S. Application Data

[62] Division of application No. 08/942,868, Oct. 2, 1997, Pat. No. 5,852,069, which is a division of application No. 08/400,891, Mar. 8, 1995, Pat. No. 5,741,875, which is a continuation-in-part of application No. 08/080,006, Jun. 21, 1993, Pat. No. 5,424,382, which is a continuation-in-part of application No. 07/789,360, Nov. 8, 1991, abandoned.

[51] Int. Cl.[7] .............................. C07G 1/00; C08L 97/00
[52] U.S. Cl. ................. 530/507; 525/54.1; 525/54.24; 525/63; 525/542
[58] Field of Search ................. 525/63, 54.1, 54.24, 525/542; 530/507

[56] References Cited

U.S. PATENT DOCUMENTS

| | | |
|---|---|---|
| 4,045,595 | 8/1977 | Chiu et al. . |
| 4,400,496 | 8/1983 | Butler et al. . |
| 4,687,828 | 8/1987 | Meister et al. . |
| 4,769,434 | 9/1988 | Van Der Klashorst et al. . |
| 4,889,902 | 12/1989 | Meister . |
| 4,891,404 | 1/1990 | Narayan et al. . |
| 4,891,415 | 1/1990 | Lin et al. . |
| 4,931,527 | 6/1990 | Meister . |
| 4,940,764 | 7/1990 | Meister . |
| 4,990,270 | 2/1991 | Meister . |
| 5,037,931 | 8/1991 | Meister . |

OTHER PUBLICATIONS

R. Narayan, Inda—Journal of NonWovens Research, 1991.
R. Narayan, Sci. & Eng. of Compositing, Renaissance Pub., OH 1993, pp. 339–362.

*Primary Examiner*—Duc Truong
*Attorney, Agent, or Firm*—Reising, Ethington, Barnes, Kisselle, Learman & McCulloch, P.C.

[57] ABSTRACT

In this disclosure, there are provided materials which completely degrade in the environment far more rapidly than pure synthetic plastics but which possesses the desirable properties of a thermoplastic: strength, impact resistance, stability to aqueous acid or base, and deformation at higher temperatures. There is provided a method for using the degradable plastic materials in preparing strong, moldable solids. There is further provided a method of making and applications for macromolecular, surface active agents that change the wetting behavior of lignin-containing materials. These surface active agents are used to provide a method of making and applications for synthetic polymers coupled to pieces of a vascular plant using macromolecular surface active agents.

4 Claims, 7 Drawing Sheets

BIODEGRADABLE PLASTICS AND COMPOSITES FROM WOOD

RELATED APPLICATIONS

This application is a division of application Ser. No. 08/942,868 filed Oct. 2, 1997 now U.S. Pat No. 5,852,069, which was a division of application Ser. No. 08/400,891 filed Mar. 8, 1995, now U.S. Pat. No. 5,741,875, which was a continuation-in-part of application Ser. No. 08/080,006 filed Jun. 21, 1993, now U.S. Pat. No. 5,424,382, which was a continuation-in-part of application Ser. No. 07/789,360 filed Nov. 8, 1991, abandoned.

FIELD OF THE INVENTION

The present invention describes thermoplastic and thermoset solids that are acid/base stable, all carbon-bonded, completely biodegradable in all components, less prone to creep, and stronger under tension.

BACKGROUND OF THE INVENTION

Most plastics are based on synthetic organic macromolecules in which long chains of atoms, joined by covalent bonds, are formed by a replication of a simple group of atoms. These macromolecules can be linear, branched, spotted with sidechains, or crosslinked. Those macromolecules that are used in the formation of articles and are not crosslinked are called thermoplastics. Those macromolecules that are crosslinked are called thermoset.

Most plastics have been developed in the past century. These materials are often inert under all processes common to the environment and all digestion chemistries used by fauna and flora. For example, since living organisms have not evolved in the presence of the homopolymer of the methyl ester of 2-methyl-2-propenoic acid, [80-62-6], or the homopolymer of 1-ethenylbenzene, [100-42-5], they can not attack or digest these materials. This inert behavior has produced large accumulations of plastic in disposal sites such as landfills or marine dumping sites. Simultaneously, these inert solids kill large numbers of animals by trapping, entanglement or obstruction of the animal's digestive system. Blends of polysaccharides and plastics designed to relieve these problems are not acid/base stable and degrade only in that the polysaccharide component degrades within a year in the environment. The synthetic plastic component is environmentally stable. Thus, a need continues to exist for new thermoplastic and thermoset materials.

SUMMARY OF THE INVENTION

The invention provides a method of grafting lignin or pieces of a vascular plant with alkene or alkyne monomers with the general structure shown in Structure 1, where $R_i$, with i=1, 2, 3, 4, 5, 6, or 7, is an organic or inorganic functional group which does not interfere with free radical polymerization, often chosen from among 0.1 hydrogen; 0.2 a halogen; 0.3 the group consisting of an organic acid, an organic alcohol, an aldehyde, an alkane, an alkene, an alkyne, an amide, an aromatic, a cycloalkane, an ester, an ether, an organic halogen, a ketone, an organic nitrile, a phenol, an organophosphate, and an organic sulfonic acid; and the structures of group 0.3 further substituted by members of such groups to produce a grafted lignin, wood, wood pulp, or wood fiber that is stable at all pH and can be blended with plastic to produce a product that is rapidly and completely degraded under terrestrial conditions by fungi and other flora or fauna.

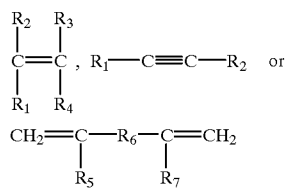

Structure 1

Such microorganisms produce a group of chemicals which contain or comprise ligninases and cellulases. Ligninase is a class label for an enzyme or chemical cascade, produced by a microorganism, that degrades lignin. Often, each genius or species that degrades lignin does so with its own, unique group of chemicals or enzyme(s). Organisms or consortia of microbes that possess the ability to degrade lignin are said to have ligninolytic activity. Cellulase is a class label for an enzyme or chemical cascade, produced by a microorganism, that degrades cellulose. Again, each genius or species that degrades cellulose does so with its own unique group of chemicals or enzyme(s). The graft copolymers disclosed here are degradable by all organisms that produce ligninase and cellulase chemistries. A general review of wood biodecomposition is given in "Biological Decomposition of Solid Wood" by T. Kent Kirk and Ellis B. Cowling, In *The Chemistry of Solid Wood*, Rowell R. M., Ed.; Advances in Chemistry Series Vol. 207, pp 435–487, American Chemical Society, Washington, D.C. (1984). The degradation process created by these copolymers is unique, however, in that the biodegradation process decomposes both the natural polymer and any synthetic polymer in it or blended with it. Of particular importance are blends of plastic and graft copolymers containing more than 5 weight percent lignin. These materials are completely degradable by organisms producing an exocellular ligninase chemistry. Organisms that can partake in the biodecomposition of the materials disclosed here are not limited to microorganisms since numerous species of ants, beetles, bees, and termites degrade these materials. Degradation by macroorganism can be by endogenous cellulases, as possessed by the Indian longhorn beetle, *Stromatium barbatum* Fabricius, or the common marine borer, *Limnoria tripunctata* Manzies; by decomposition of the nonstructural materials of the wood in the disclosed material, as would occur in ambrosia beetles, lyctus beetles or carpenter ants; or by decomposition of the lignin in the disclosed material, as would occur in the termite *Nasutitermes exitiosus*.

The method of making the grafted, lignin-containing materials generally comprises:
 a) crushing, grinding, sawing, chipping, barking, pulping, refining a lignin-containing material to expose a lignin-containing surface, or extracting by physical or chemical means the lignin in such a material;
 b) adding the lignin-containing material or extract to a solvent or to a liquid, neat monomer;
 c) dissolving the lignin into the solvent or dispersing the lignin-containing material uniformly in the solvent or neat monomer;
 d) adding a halide salt;
 e) adding at least one of a hydroperoxide or a solid peroxide;
 f) maintaining an inert atmosphere in the reaction mixture;
 g) adding the monomer or monomers, thereby initiating free radical polymerization;

h) allowing the polymerization to take place for a sufficient time;

i) terminating the reaction by exposing the reaction mixture to oxygen or a free radical scavenger; and j) recovering the product by precipitation, filtration, centrifugation, freeze drying, distillation, or other appropriate means.

The process gives a product with the structure shown in FIG. 2, where the $R_i$ with i=1, 2, 3, or 4 in the sidechain is any group which does not interfere with free radical polymerization and A is a lignin-containing-material. If the product of FIG. 2 was formed by a reaction containing an ethyne monomer, the carbon-carbon single bond, —C—C—, would be replaced with a carbon-carbon double bond, —C=C—, and there would be only two substituents, $R_i$, with i=1 or 2. Representing the grafted sidechains as

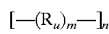

the number of such polymerized sidechains, n is between 1 and 500 and the number, m, of repeat units, $R_u$, in each sidechain is between 1 and 500,000 where

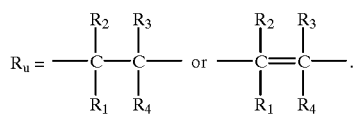

Polymeric sidechains described above for grafting to lignin can be attached to pulp, wood, bark, leaves, or any other part of a vascular plant by the processes described in this disclosure. The reaction need not be run on just lignin or a lignin-containing material but can be run on mixtures of lignin and wood, for example. To maximize the amount of grafting onto a lignin-containing material, it is often best to pretreat the lignin-containing material with a sulfite salt, often in aqueous solution, by mixing and heating the salt and material together before use of the material in the grafting reaction. The product of a reaction on lignin is a graft copolymer containing a lignin backbone and at least one polymeric, synthetic sidechain carbon-carbon bonded to the lignin. In general, the lower the lignin content of the material to be grafted and used in a degradable plastic, the less effective the process for adding sidechains or surface coats is. In the use of a lignin-containing material in the process, the "lignin" referred to in a discussion of the process is the lignin on the surface of the wood fiber or pulp. Pulps such as thermomechanical pulp or mechanical pulp have surfaces with a high lignin content and are readily altered by grafting chemistry to make a plastic. Use of wood in place of extracted lignin allows easier recovery of the reaction product since the treated wood can be recovered from the reaction mixture by filtration and all byproducts of the reaction, such as dissolved graft copolymer, can be recovered by simple separations such as dialysis, precipitation in nonsolvent, and freeze drying. The product of a reaction on pulp is a surface-modified pulp which has at least one polymeric sidechain carbon-carbon bonded to the surface of the pulp fiber or particle.

These grafted copolymers, when blended with other plastics or polymers, form articles of manufacture which completely degrade in the environment. Articles of manufacture containing synthetic, plastic materials that degrade rapidly and completely in the environment are made, in general, by using a blend of the grafted copolymer with any fraction of another polymer or plastic and shaping the blend by any method commonly used to make thermoplastic or thermoset articles. Such methods include but are not limited to: injection molding, blow molding, extrusion, vacuum forming, compression molding, transfer molding, reaction injection molding, or reinforced reaction injection molding. These products and their blends with plastics are stable in the presence of aqueous acid or base. These grafted copolymers can be used to make three component materials that are acid/base stable; have stronger bonding between two of the components; and are completely degradable, in all components, in the environment.

The products synthesized by the previously described method are macromolecular, surface active agents; grafted lignin or lignin-containing materials; and thermoplastic or thermoset, lignin copolymers. The articles of manufacture containing macromolecular, surface active agents that change the wetting behavior of lignin-containing materials are made, in general, by coating, spraying, dusting, melting, extruding, smearing, or dispensing the product of the reaction just described onto a substrate that contains lignin. One such common substrate would be wood. The reason the macromolecular, surface active agent is applied to the wood is to allow a hydrophobic phase, such as a plastic, to bind to the wood. Usually, the wetting agent has been synthesized so that the sidechain attached to the lignin during the preparation of the macromolecular, surface active agent is chemically identical to the plastic hydrophobic phase that is to be bound or connected to the wood. Thus, to bind poly(1-phenylethylene) ([9003-53-6], Trivial name=polystyrene) to wood, coat the wood with poly(lignin-g-(1-phenylethylene)) and to bind poly(1-cyanoethylene) ([25014-41-9], Trivial name=polyacrylonitrile or orion) to wood, coat the wood with poly(lignin-g-(1-cyanoethylene)). The lignin-containing materials are usually treated with the product of the grafting reaction by contacting the surface of the lignin-containing material with a melt of the grafted product. This coated material may then be enveloped by a polymeric phase.

The polymeric phase consists of at least one polymer molecule, $R'_p$, composed of at least one repeat unit, $R'$, that has been polymerized by step or chain polymerization to form at least one bond each to two other repeat units. The average polymer molecule has p repeat units where p is between 25 and 500,000 such that the total molecular weight of the average molecule is between 500 and 50,000,000. As examples of polymers that may be used in blending or binding to a lignin-containing material, some common materials that would be used in this invention listed by chemical class would be at least one of main-chain acyclic, carbon polymers such as poly(acetylenes), poly(dienes), poly(alkenes), poly(acrylic acids), poly(acrylates), poly(poly(methacrylates), poly(disubstituted, acrylic esters), poly(acrylamides), poly(methacrylamides), poly(vinyl ethers), poly(vinyl alcohols), poly(acetals), poly(vinyl ketones), poly(vinyl halides), poly(vinyl nitrites), poly(vinyl esters), and poly(styrenes); main-chain carbocyclic polymers such as poly(phenylenes); main-chain acyclic, heteroatom polymers such as poly(phosphazenes), poly(silanes), and poly(silazanes); main-chain acyclic, heteroatom polymers with —C—O—C— bonding such as poly(oxides), poly(carbonates), poly(esters), poly(anhydrides), and poly(urethanes); main-chain acyclic, heteroatom polymers with —O— bonding such as poly(sulfonates) and poly(siloxanes); main-chain acyclic, heteroatom polymers with —C—S—C— and —C—S—N— bonding such as poly(sulfides) and poly(sulfones); main-chain acyclic, heteroatom polymers with —C—N—C— bonding such as poly(amides), poly(hydrazides), poly(ureas), and poly (carbodiimides); main-chain heterocyclic polymers such as poly(benzoxazoles), poly(oxadiazoles), poly(oxadiazolidines), poly(dithiazoles), poly(benzothiazoles), poly(pyromelitimides), poly(quinoxalines), poly(benzimidazoles), poly(piperazines), and poly(anhydrides); and formaldehyde resins. Examples of specific polymer structures in each of the above chemical classes are tabulated in the "Polymer Handbook", Third Edition, J. Brandrup, E. H. Immergut, Eds., Wiley-Interscience (1989).

These processes produce a biodegradable material in which all components are far more rapidly attacked and degraded than is a synthetic material of the same shape and size. Free radically grafting lignin or pieces of a vascular plant with ethene monomers and using a blend of grafted copolymer and an all-synthetic polymer produce a material in which both components of the blend degrade in the environment. Since the grafted materials possess carbon-carbon bonds between backbone and sidechain, blends containing grafted material are stable in contact with water of any pH. These new materials thus have application stability and environmental degradability. Free radically grafting lignin or pieces of a vascular plant with ethene monomers and using a blend of grafted copolymer between 1. a synthetic polymer and
2. the chemical constituents or pieces of a vascular plant produce an acid/base stable material which is
   1. stronger than blending synthetic polymer and vascular plant alone and
   2. completely degradable in all components in the environment.

Accordingly, it is an object of the present invention tp provide materials which completely degrade in the environment far more rapidly than pure synthetic plastics but which possess the desirable properties of a thermoplastic: strength, impact resistance, stability to aqueous acid or base, and deformation at higher temperatures. It is also an object of this invention to provide a method for using the degradable plastic materials in preparing strong, moldable solids. It is a further object of this invention to provide a method of making and applications for macromolecular, surface active agents that change the wetting behavior of lignin/containing materials. It is also an object of this invention to provide a method of making and applications for synthetic polymers coupled to pieces of a vascular plant using macromolecular surface active agents.

BRIEF DESCRIPTION OF THE DRAWINGS

FIG. 4A shows the constituent loss after incubation with *Gloeophyllum trabeum*. In FIGS. 4A through D, the letters LPS stand for lignin polystyrene and the numbers 10, 32 and 50 designate the percent lignin in the blend.

DETAILED DESCRIPTION OF THE PREFERRED EMBODIMENTS

Figure 1:
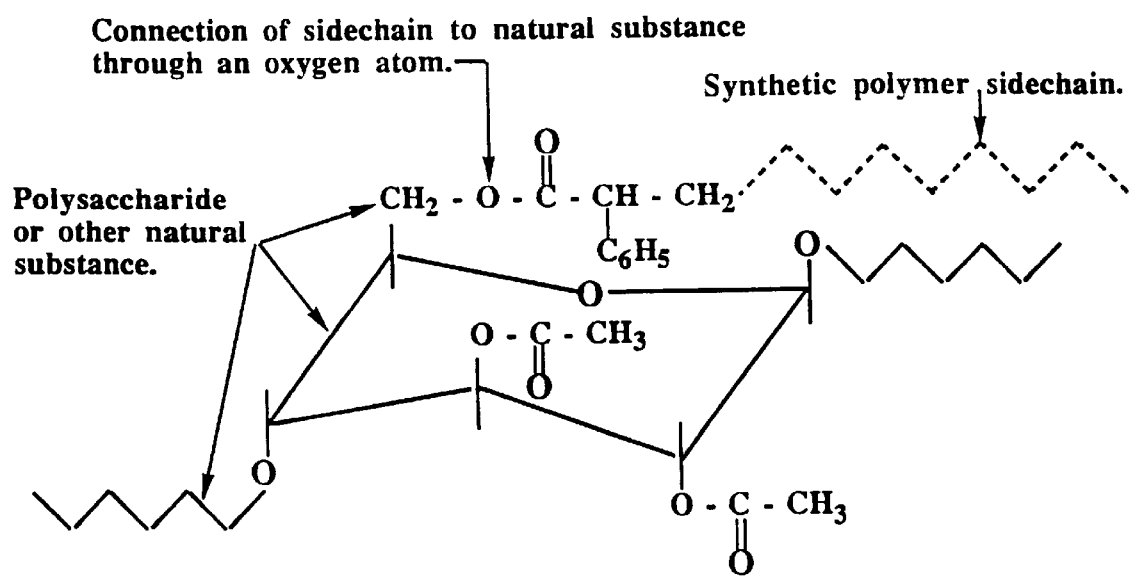
FIG. 1 is the chemical structure of the ester or thioester which results from the art of Narayan, et. al. in U.S. Pat. No. 4,891,404. The reaction of the polymeric anion with a natural product must produce an oxygen or sulfur bond between the synthetic sidechain and the natural backbone of the graft copolymer.
Figure 2:
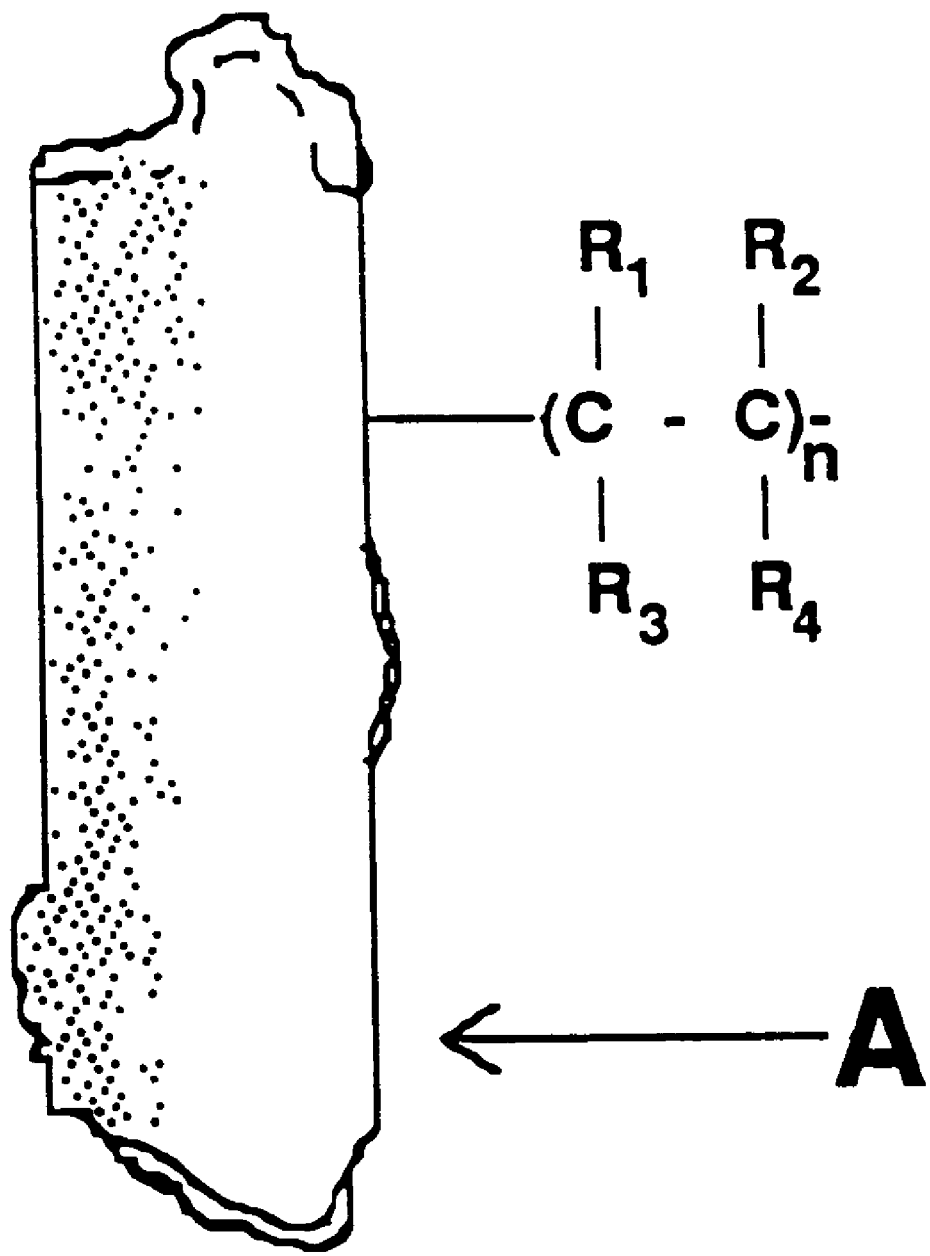
FIG. 2 is an image of a lignin-containing material or part of a vascular plant that has been grafted by the method of the present invention.

In accordance with the present invention, there is provided a method of blending grafted, lignin-containing materials with other polymers; blends of grafted, lignin-containing materials and other polymers; a method of combining two separate phases using a macromolecular, surface active agent; articles of manufacture containing macromolecular, surface active agents that change the wetting behavior of lignin-containing materials; thermoplastic materials that degrade rapidly and completely in the environment yet contain all-synthetic polymers; thermoplastic materials that are acid/base stable; and a method of maximizing grafting of materials that contain lignin by first pretreating the material with sulfite.

The following terminology is used in this disclosure and is defined here to clarify but not limit this disclosure. Lignin [8068-00-6] is derived from vascular plants. Lignin, which makes up about 25% of the weight of dry wood, acts as a cementing agent to bind the matrix of cellulose fibers together into a rigid woody structure. Common subclasses of lignin are: chlorinated lignin, [8068-02-8]; 1,n-dioxacyclohexane acidolysis lignin, [8068-03-9]; Holmberg lignin, [8068-07-3]; hydrochloric acid lignin, [8068-11-9]; kraft lignin, [8068-05-1] or [8068-06-02]; soda lignin, [8068-05-1] or [8068-01-7]; sulfite lignin, [8062-15-5]; and [8068-04-0]. These materials are all described in detail in U.S. Pat. No. 4,889,902, Soluble or Crosslinked Graft Copolymer of Lignin Acrylamide and 2-Hydroxyethylmethacrylate; U.S. Pat. No. 4,931,527, Water Soluble Graft Copolymer of Lignin, Methods of Making the Same and Uses Therefore; and U.S. Pat. No. 4,940,764, Water Soluble Graft Copolymer of Lignin, Methods of Making the Same. Alternatively, this invention may be applied by use of any lignin-containing material such as wood or any piece of a vascular plant. Wood is defined as the hard fibrous substance, basically xylem, that makes up the greater part of the stems and branches of trees or shrubs. It is found beneath the bark and is also found to a limited extent in all herbaceous or vascular plants. The Technical Association of the Pulp and Paper Industry recognizes several forms of wood pulp. These are groundwood pulp, refiner mechanical pulp, thermomechanical pulp, chemithermomechanical pulp, and chemical pulps. For further information on pulps, see the Kirk-Othmer Encyclopedia of Chemical Technology, Volume 19, pp 392 to 396, Wiley Interscience (1982), ISBN 0-471-02072-9. Other forms of wood that can be used in this process are sticks, fibers, branches, bark, and veneer.

Vascular plants are the members of the plant kingdom with an internal organization of tubes, xylem and phloem channels, made out of three types of cells, parenchyma, collenchyma, or sclerenchyma cells. A piece of the plant is any contiguous group of cells and structures of a root, shoot, or leaf of the plant. A mixture of the chemical constituents of a plant contains cellulose, hemicellulose, and lignin, possibly contaminated with the inert "mineral" portion of the plant: starch, lipid, silica bodies, silica stegmata, protein bodies, and mucilage.

The word polymer is used in blending and binding discussions to mean a compound formed by polymerization. Polymers are usually made by step or chain polymerization and are essentially large molecules made up by the linking of many smaller molecules or monomers. The term plastic means solids composed of molecules containing 100 or more repeat units that can be heated and reformed. A miscible polymer blend is a mixture of at least two polymers that is homogenous down to the molecular level and forms with a negative Gibbs free energy of mixing. The term Gibbs free energy labels a thermodynamic measure of the energy causing a reaction to produce product. The term Gibbs free energy labels a thermodynamic measure of the energy causing a reaction to produce product. In this disclosure, many tabulated examples have the example numbers in parentheses after the sample number, percentages are by weight and temperatures are in centigrade unless otherwise indicated.

A surface active agent is a molecule that contains at least two portions that differ from one another in chemical composition. The differences in chemical composition cause the molecule to be soluble in two classes of materials, each class being of similar composition or bonding structure to one portion of the molecule. Because of the differences in chemical composition, however, the molecule's two portions are not equally soluble in the same solvents. This differential solubility causes the molecule to dissolve in a given solvent by reduction of the Gibbs free energy of one portion of the molecule only. Indeed, the rest of the molecule may actually have its Gibbs free energy raised by this solution process. Usually, the other portion of the molecule will only have its Gibbs free energy lowered by solution in a solvent chemically different from and immiscible with the first. When placed in a mixture of these two solvents, the surface active solute has its lowest free energy when it is at the interface between the two solvents.

Wetting is the capacity of a drop of one phase to form an interface with another in such a way that at the edge of the interface, the angle formed by the interface and the surface of the drop is less that 90°. The angle is measured through the phase of the drop. The closer to 0° the angle is, the better the wetting of the drop on the other phase.

The following terminology has been proposed by the American Society for Testing and Materials, Section D20.96 and is consistent with the terminology of the International Standards Organization, Geneva, Switzerland (ISO 472:1988). Degradation is a change in the chemical structure of a plastic involving a deleterious change in properties. Deterioration is a permanent change in the physical properties of a plastic evidenced by impairment of these properties. A degradable plastic is a plastic designed to undergo a significant change in its chemical structure under specific environmental conditions resulting in a loss of some properties that may vary as measured by standard test methods appropriate to the plastic and the application in a period of time that determines its classification. A biodegradable plastic is a degradable plastic in which the degradation results from the action of naturally-occurring microorganisms such as bacteria, fungi and algae.

Biodegradation implies either the utilization of the plastic or polymer substrate as a sole carbon source for an organism or co-metabolism/gratuitous metabolism of the substrate resulting in the production of 1. $CO_2$ under aerobic environments or 2. $CH_4$ under anaerobic environments, as well as humic type materials. Composting is defined as "accelerated degradation of heterogeneous organic matter by a mixed microbial population in a moist, warm, aerobic environment under controlled conditions." The materials disclosed here are completely biodegradable. All parts of the blend degrade in the environment. The materials disclosed here are completely compostable.

The preparation of these materials is accomplished, in general, under oxygen-free conditions by combining a redox initiator; a halide salt; one or more monomers polymerizable by free radical reaction; and, possibly, a suitable solvent; with a lignin-containing material to create a dispersion and allowing time for graft polymerization to occur. Articles of manufacture containing macromolecular, surface active agents that change the wetting behavior of lignin-containing materials are made, in general, by coating the lignin-containing material with lignin grafted with monomers polymerizable by free radical reaction. The coated material may then be further enveloped by a polymer phase. Articles of manufacture containing polymer that degrade more rapidly in the environment than synthetic products are made, in general, by using a blend, with polymer, of grafted substances that contain free-radically polymerized monomers bound to materials that contain lignin and shaping the resulting mixture.

DETAILED DESCRIPTION OF THE GENERAL PROCESS

The method, products, and properties of those products will now be described, generally. As a medium for conducting this reaction, one can use the neat monomer, mixture of monomers, or a suitable solvent for the graft copolymerization of the present invention. A selection of suitable solvents for the graft copolymerization are shown in Table 1.

TABLE 1

| Liquids Useful in Solution Polymerization of Graft Copolymers. | |
|---|---|
| Dimethylsulfoxide (DMSO) | Dimethylacetamide |
| 1,4-Dioxacyclohexane | Dimethylformamide |
| Water | 1-Methyl-2-pyrrolidinone |
| Pyridine | |

The choice of lignin-containing material is apparently general. It is general in that a whole series of lignins withdrawn from wood by different techniques have been grafted by this method, as shown by the data of Table 2. The lignins may be grass, softwood, or hardwood lignins and may be extracted from the plant by any method. The lignin-containing material can also be groundwood pulp, refiner mechanical pulp, thermomechanical pulp, chemithermomechanical pulp, chemical pulps, wood chips, wood, wood meal, wood fiber, bark, leaves, branches, veneer, and lignin, or any other lignin-containing, plant product. Particularly effective as a wood is chemithermomechanical pulp treated with sodium sulfite to improve amount of monomer bound to the wood and conversion of monomer to polymer.

TABLE 2

| Lignins And Woods Grafted With This Chemistry | | | | | |
|---|---|---|---|---|---|
| Pine | Aspen | Yellow Poplar | Spruce | Corn | Hemlock |
| Oak | Bagasse | Bamboo | Birch | Red Oak | Fir |

A selection of suitable hydroperoxides for the graft copolymerization is shown in Table 3 and suitable salts, halides, are shown in Table 4.

TABLE 3

Hydroperoxides Useful in Polymerization of Lignin-Containing Materials.

| | |
|---|---|
| hydrogen peroxide | 2-hydroperoxy-1,4-dioxycyclohexane |
| 3,3-dimethyl-1,2-dioxybutane | 1-hydroperoxybenzene |
| 1-(2-hydroperoxypropyl)benzene | |
| Anhydrous Solid Peroxides: | magnesium peroxyphthalate |
| sodium peroxyborate | |
| sodium percarbonate | |

TABLE 4

Some Halides Useful in Polymerization of Lignin Containing-Materials.

| | | |
|---|---|---|
| Calcium Chloride | Magnesium Chloride | Sodium Chloride |
| Potassium Chloride | Lithium Chloride | Ammonium Chloride |
| Calcium Bromide | Magnesium Bromide | Sodium Bromide |
| Potassium Bromide | Lithium Bromide | Ammonium Bromide |
| Calcium Fluoride | Magnesium Fluoride | Sodium Fluoride |
| Potassium Fluoride | Lithium Fluoride | Ammonium Fluoride |

The monomers are alkenes or alkynes of the general structure

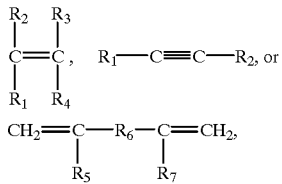

where $R_i$, with i=1, 2, 3, 4, 5, 6, or 7, is an organic or inorganic functional group which does not interfere with free radical polymerization, often chosen from among 0.1 hydrogen; 0.2 a halogen; 0.3 the group consisting of an organic acid, an organic alcohol, an aldehyde, an alkane, an alkene, an alkyne, an amide, an aromatic, a cycloalkane, an ester, an ether, an organic halogen, a ketone, an organic nitrile, a phenol, an organophosphate, and an organic sulfonic acid; 0.4 the group specified at 0.3 substituted in at least one, tetravalent carbon atom by a divalent heteroatom with the atomic symbol S, Se, Te, Si, Ge, Sn, or Pb, a trivalent heteroatom with the atomic symbol N, P, As, Sb, Bi, or B, or a tetravalent heteroatom with the atomic symbol S, Se, Te, Si, Ge, Sn, or Pb; and 0.5 the structures of groups 0.3 and 0.4 further substituted by members of such groups. Examples of such monomers are: 1 chloroethene; 1,1,2,2-tetrafluoroethene; 1-phenylethene; 1,2-diphenylethene (stilbene); 1-(j-halophenyl)ethene where j is 2, 3, or 4 and the halide substituent is fluorine, chlorine, or bromine; 1,k-diethenylbenzene or k-ethenylpyridine, where k=2, 3, or 4; 1,3 -butadiene; 3-buten-2-one; 2-thio-3-butene; 2-methyl-1,3-butadiene; 2-chloro-1,3-butadiene; 2-propenoic acid; 2-propen-1-al (acrolein); 2-propene nitrile; 2-methyl-2-propenoic acid; 1,1-dichloroethene; 1,2-dichloroethene; 2-propenamide; N,N-dimethyl-2-propenamide; N,N-bis(2-propenamido)methane; 1-methyl-1-phenylethene; 2-oxo-3-oxypent-4-ene; a 2-methyl-3-oxo-4-oxybut-1-ene-(p-ethoxy-(3*p+3)-ol where p varies from 1 to 300,000; 2-methyl-2N-propenamidopropane sulfonic acid which is neutralized with one or more cations chosen from among hydrogen, lithium, sodium, potassium, ammonium, zinc, magnesium, or calcium; dimethyidiprop-2-enylammonium chloride; (3-oxy-4-oxo-5-methylhex-5-enyl) trimethylammonium methylsulfate; (3-oxy-4-oxo-5-methylhex-5-enyl)trimethylammonium chloride; 2-oxy-3-oxopent-4-ene; 4-methyl-2-oxy-3-oxopent-4-ene; propene; ethene sulfonic acid; and ethene. In the name 2-methyl-3-oxo-4-oxybut-1-ene-(p-ethoxy-(3*p3)-ol, p is an integer greater than 0 and denotes the number of ethoxy groups, —O—$CH_2$—$CH_2$—, in the alkoxy chain attached to the organic acid group.

The method of making the grafted, lignin-containing materials generally comprises:

a) crushing, grinding, sawing, chipping, barking, pulping, refining a lignin-containing material to expose a lignin-containing surface, or extracting by physical or chemical means the lignin in such a material;

b) adding the lignin-containing material or extract to a solvent or to a liquid, neat monomer;

c) dissolving the lignin into the solvent or dispersing the lignin-containing material uniformly in the solvent or neat monomer;

d) adding a halide salt;

e) adding at least one of a hydroperoxide or a solid peroxide;

f) maintaining an inert atmosphere in the reaction mixture;

g) adding the monomer or monomers, thereby initiating free radical polymerization;

h) allowing the polymerization to take place for a sufficient time;

i) terminating the reaction by exposing the reaction mixture to oxygen or a free radical scavenger; and j) recovering the product by precipitation, filtration, centrifugation, freeze drying, distillation, or other appropriate means.

The products made by this method are macromolecular, surface active agents; grafted lignin or lignin-containing materials; and thermoplastic or thermoset, lignin polymers. The reaction need not be run on just lignin or a lignin-containing material but can be run on mixtures of lignin and wood, for example. To maximize the amount of grafting onto a lignin-containing material, it is often best to pretreat the lignin-containing material with a sulfite salt, often in aqueous solution, by mixing and heating the salt and material together before use of the material in the grafting reaction.

Figure 3A:
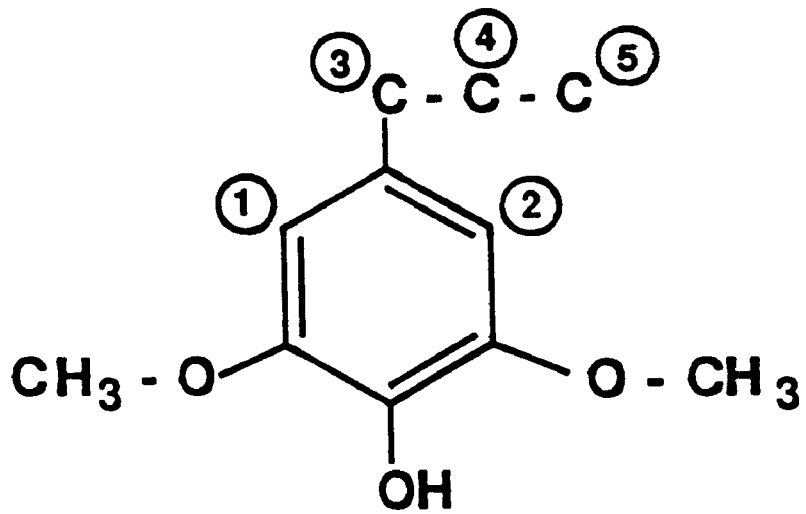
FIG. 3A, is the common element and bonding pattern for most repeat units of lignin. The second structure, FIG. 3B, can occur in the graft copolymer of this invention, with $R_u$ being the sidechain.
Figure 3B:
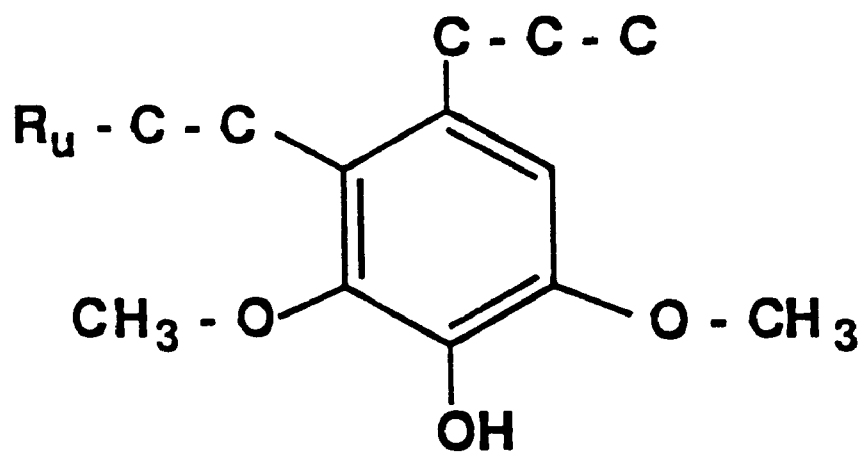
FIG. 3 shows two chemical structures. The first structure.

The products have carbon-carbon bonds between the materials grafted and the sidechains grafted to those materials. This carbon-carbon bonding occurs at one or more of sites 1, 2, 3, 4, or 5, on the aromatic ring or alkyl chain of a common lignin repeat unit. The structure of a typical repeat unit, with a definition of the above numbering convention, is shown in the top of FIG. 3 as FIG. 3A. Under the unique chemical reaction disclosed here, the synthetic polymer ($R_u$=sidechain) is connected to a typical repeat unit of lignin through carbon-carbon bonds, as shown in the bottom of FIG. 3 as FIG. 3B. Bonding at sites 1 or 2 is most probable. In FIG. 3B, $R_u$ is a synthetic polymer sidechain having a carbon-based backbone resulting in connection of the sidechain to the natural substance through carbon-carbon bonds. This bonding structure permits the grafted products and blends of polymer and the grafted products to be stable in the presence of acid or base. Other copolymers, such as those claimed by Narayan, et. al. in U.S. Pat. No. 4,891,404, have been proposed as thermoplastics for commercial application. These products are produced from capped polymeric chains of the structure

where R is an organic group produced by anionic polymerization, M+ is a cation, and X and Y are O or S (Column 4, lines 1 to 20, U.S. Pat. No. 4,891,404). When this product is reacted with a natural product that contains hydroxyl groups, such as cellulose or lignin, an ester or thioester results,

The chemical structure of the ester or thioester which results from the art of Narayan, et. al. in U.S. Pat. No. 4,891,404 is shown in more detail in FIG. 1. Here, R'—OH is cellulose or lignin. These ester and thioester links are liable under attack by acid or base, as disclosed by the inventors in C. J. Biermann, J. B. Chung, R. Narayan, Macromolecules, 1987, 20, 954–957, on page 956, bottom right column.

Such chemical instability at non-neutral pH would render these products useless for even simple applications such as containers for soda pop (pH=3) or laundry soap (pH=11). Thus, a need continues to exist for products with the desirable properties of thermoplastics and the capacity to completely degrade in the environment. Blends of polymer and grafted vascular plant are both thermoplastic and completely degradable. The rapidity with which both components of the blend degrade in the environment increases with increasing content of grafted product. The blend should be at least 0.1 weight percent copolymer but blends with at least 5 percent copolymer are preferred and blends with at least 5 percent lignin are most preferred.

In the past, others have used the word "biodegradable" to describe the partial decomposition of a combination of natural product and synthetic thermoplastics. The "biodegradation" of these blends leaves the synthetic portion of the blend as an untouched residue that will remain in the environment for decades if not centuries. Federal Commerce Commission and state regulations now prohibit the use of the word "biodegradable" to describe these combinations in commercial and public speech since the materials do not completely degrade. An example of this technology is the work of Narayan, et. al. in U.S. Pat. No. 4,891,404. The thermoplastic esters of cellulose and lignin are proposed as degradable with no experimental support for the claim because the natural portion of the material can degrade in the environment. The fact that only the natural product degrades in these natural product/synthetic sidechain materials is recognized by the technical community at large, as shown by the comments of J. E. Potts in his review of environmentally degradable plastics in the Encyclopedia of Chemical Technology, p. 647, Supplement, J. Wiley and Sons, New York (1982) and by the writings of the inventor himself in INDA Journal of Nonwoven's Research, 3, #1, third page. Narayan's disclosure that when lignocellulose-polyolefin compositions biodegrade, only the lignocellulose portion is degraded, is a statement of the state of previous technology. Dr. Narayan has also helped prove this limit on the use of natural products to make plastics biodegrade by showing that polyethylene/lignocellulose blends have only the lignocellulose portion degrade when composted. These results are disclosed in the data of page 350 and the comments of page 352 of "Biodegradation of Polymeric Materials (Anthropogenic Macromolecules) During Composting" by Ramani Narayan, pp. 339 to 362 in Science and Engineering of Composting, Proceedings of an International Composting Research Symposium, 3/27-29/92, Columbus, Ohio, Renaissance Publications, Ohio (1993) ISBN 0-935545-15-6. That technology has now been revolutionized by proof that a carbon bonded, free radically polymerized, grafted lignin-containing material will induce complete biodegradation in blends of these grafted materials and polymers.

There are numerous organisms which degrade these materials. These ligninolytic organisms are grouped into three kingdoms, Animalia, Monera, and Fungi. These kingdoms and the others of the new classification of life are defined in R. H. Whittaker, New Concepts of Kingdoms of Organisms, Science, 163: 150–160, (1969). In the classification scheme; Kingdom, Division, Class, Order, Family, Genus, and species; the degrading organisms of Animalia are: woodpeckers, Aves Piciforme Picidae; insects, Arthropoda Insecta in Orders Isoptera, Coleoptera, and Hymenoptera; and marine borers, Teridinidae, Pholoads, and Isopods. In the Kingdom Monera, the Divisions are Bacteria, Actinomycetes, and Cyanobacteria. All of these Divisions contain organisms which degrade lignin-containing-materials. Bacteria degrade vascular plants and lignin-containing-materials with Cytophaga, Clostridium, and Bacillus being major genera of most active collection of lignin degraders. The most active collection of lignin degraders. The Fungi important in the degradation of lignin-containing-materials are in the Division Eumycota and are organized into five subdivisions. There are Mastigomycotina, Zygomycotina, Ascomycotina, Deuteromycotina, and Basidiomycotina. The classification of fungi has undergone extensive revision as new information on the biochemistry, genetics, and internal structure of fungi was published. This new classification, used in Ainsworth and Bisby's Dictionary of the Fungi, Seventh Edition, D. L Hawkswothy, B. C. Sutton, G. C. Ainsworth, Commonwealth Mycologial Institute, Kew, Surrey, England, 1983, will be used here.

In the subdivision Mastigomycotina, the important Classes are Chrytridomycetes of the Genus Chytridium spp. and Oomycetes of the Genus Pythium spp. In the subdivision Zygomycotina, the important Genera are Rhizopus spp., Endogone spp., and Entomphthora spp. It is important to understand that these labels are in flux and not universally accepted. Some taxonomists have regrouped the Oomyctetes among the algae.

In the subdivision Ascomycotina, there are 36 orders of important organisms involved in the degradation of lignin-containing-materials. These include the Hemiascomycetes as represented by the yeasts Saccharomyces spp. and *Endomycopsis fasiculata*. In the Cleistothecium, the Talaromyces spp., *Chaetomium globosum*, Ceratocystis spp., and Ophiostoma spp. are important degraders and pathogens. In the Perithecium, Xylaria spp., *Daldinia concentrica*, and *Ustilina deusta* are important degrading fungi. In the Apothecium, Cladonia spp., Morchella spp., and *Umula craterium* (anamorph=*Strumella corynecida*) are important degraders.

In the subdivision Deuteromycotina, there are about 17,000 species important in degradation of lignin-containing-materials. These are grouped into the Coelomycetes as represented by the Cytospora spp., *Mycosphaerella deamessii, Sphaeropsis* (Diplodia) *sapinea,* and the Phoma spp. and the Hyphomycetes as represented by *Hormoconis resinas,* the *Trichoderma* spp., *Scytalidium lignicola,* the *Phialophora* spp., and *Aureobasidium pullulans.* The subdivision Basidiomycotina is particularly important in degradation of lignin-containing-materials and is currently organized into Ustilaginomycetes as represented by *Ustilago maydis;* Urediniomycetes as represented by *Cronartium ribicola;* Gasteromycetes as represented by *Calvaria gigantea,* the Geastrum sp., and the Scleroderma spp.; and Hymenomycetes divided into 2 subclasses and 12 Orders. The 2 subclasses of Hymenomycetes are Holobasidiomycetidae and Phragmobasidiomycetidae with the Holobasidiomycetidae further divided into the Agaricates as represented by *Neolentinus* (Lentinus) *lepideus, Armillaria mellea,* and *Tapinella* (Paxillus) *panuoides;* the Septobasidiales as represented by the Septobasidium spp.; the Dacrymycetales as represented by *Dacrymyces stillatus;* and the Aphyllophorales with its 400 genera; and with the Phragmobasidiomycetidae further divided into the Tremeliales, as represented by *Exidia glandulosa* and *Pseudohydnum gelatinosum,* and Auriculariales as represented by *Helicobasidium corticioides.* These subdivisions, Classes, subclasses, Orders, Families, Genera, and species are further described in Wood Microbiology: Decay and its Prevention by Robert A. Zabel and Jeffrey J. Morrell as published by Academic Press, Inc. San Diego, Calif., 1992, ISBN 0-12-775-210-2, which is herein included by reference.

The most effective ligninolytic organisms are in the kingdoms Monera and Fungi. A broad spectrum of the members of these kingdoms degrade lignin. This has been shown by the studies of K. Haider and J. Trojanowski, Chapter 6, and S. Iwahara, Chapter 8, of the text: Ugnin biodegradation: Microbiology, Chemistry, and Potential Applications, Volume 1, T. Kent Kirk, Takayoshi Higuchi, Hou-min Chang, Editors, CRC Press, Inc., Boca Raton, Fla., 1981, ISBN 0-8493-546-9 which are included herein by reference. These studies show that bacteria, yeasts, and molds degrade lignin. Thus, if a thermoplastic object is made from a grafted, vascular plant part and a thermoplastic polymer and it is exposed to woodpeckers, insects, and marine borers of the kingdom Animalia; Bacteria, Actinomycetes, and Cyanobacteria of the kingdom Monera; and members of the kingdom Fungi under specific conditions, then both the grafted, vascular plant part and the thermoplastic polymer in the object will degrade to humus, assimilated matter in the organisms, and mineralized carbon, hydrogen, oxygen, and nitrogen in a period of a few months to a few years. Proof of this degradation behavior, methods of making these biodegradable blends, biodegradable blends, and applications for the blends from this revolutionary technology are disclosed here.

The articles of manufacture containing macromolecular, surface active agents that change the wetting behavior of lignin-containing materials are made, in general, by coating, spraying, dusting, melting, extruding, smearing, or dispensing the product of the reaction just described onto a substrate that contains lignin. One such common substrate would be wood. The reason the macromolecular, surface active agent is applied to the wood is to allow a hydrophobic phase, such as a plastic, to bind to the wood. Usually, the wetting agent has been synthesized so that the sidechain attached to the lignin during the preparation of the macromolecular, surface active agent is chemically identical to the plastic hydrophobic phase that is to be bound or connected to the wood. Thus, to bind poly(1-phenylethylene) [Trivial name=polystyrene] to wood, coat the wood with poly(lignin-g-(1-phenylethylene)) and to bind poly(1-cyanoethylene) [Trivial name=polyacrylonitrile or orion] to wood, coat the wood with poly(lignin-g-(1-cyanoethylene)). The lignin-containing materials are usually treated with the product of the grafting reaction by either spreading a solution of the grafted lignin on the surface of the lignin-containing material and allowing the solvent to evaporate or by contacting the lignin-containing material with a melt of grafted product. This coated material may then be enveloped by a polymeric phase. Such coated composites are stronger than uncoated composites with an improvement in tensile strength of 50 to 300 percent routinely resulting from coating the lignin-containing material with a grafted product.

Articles of manufacture containing synthetic plastic that degrade rapidly and completely in the environment are made, in general, by mixing a grafted lignin-containing material with any fraction of another polymer or plastic and shaping the blend by any method commonly used to make thermoplastic or thermoset articles. Such methods include but are not limited to: injection molding, blow molding, extrusion, vacuum forming, compression molding, transfer molding, reaction injection molding, or reinforced reaction injection molding.

Blended or mixed with the grafted lignin-containing-material is B, a synthetic polymer consisting of at least one polymer molecule, $R'_q$, where R' designates a monomer repeat unit, q designates the number of repeat units, q is between 25 and 500,000, and the total molecular weight of the average polymer molecule is between 500 and 50,000,000. As examples of polymers that may be used in blending or binding to a lignin-containing material, some common materials that would be used in this invention listed by chemical class would be at least one of main-chain acyclic, carbon polymers such as poly(acetylenes), poly(dienes), poly(alkenes), poly(acrylic acids), poly(acrylates), poly (poly(methacrylates), poly(disubstituted, acrylic esters), poly(acrylamides), poly(methacrylamides), poly(vinyl ethers), poly(vinyl alcohols), poly(acetals), poly(vinyl ketones), poly(vinyl halides), esters), a nitrites), poly(vinyl esters), and poly(styrenes); main-chain carbocyclic polymers such as poly(phenylenes); main-chain acyclic, heteroatom polymers such as poly(phosphazenes), poly(silanes), and poly(silazanes); main-chain acyclic, heteroatom polymers with —C—O—C— bonding such as poly(oxides), poly(carbonates), poly(esters), poly(anhydrides), and poly (urethanes); main-chain acyclic, heteroatom polymers with —O— bonding such as poly(sulfonates) and poly (siloxanes); main-chain acyclic, heteroatom polymers with —C—S—C— and —C—S—N— bonding such as poly (sulfides) and poly(sulfones); main-chain acyclic, heteroatom polymers with —C—N—C— bonding such as poly (amides), poly(hydrazides), poly(ureas), and poly (carbodiimides); main-chain heterocyclic polymers such as poly(benzoxazoles), poly(oxadiazoles), poly (oxadiazolidines), poly(dithiazoles), poly(benzothiazoles), poly(pyromelitimides), poly(quinoxalines), poly (benzimidazoles), poly(piperazines), and poly(anhydrides); and formaldehyde resins. An example of a common polymer that may be used in binding would be at least one of poly(butadiene), poly(ethylene), poly(propylene), poly (tetrafluoroethylene), poly(acrylonitrile), poly(vinyl chloride), poly(vinyl acetate), poly(methyl methacrylate), poly(styrene), poly(oxymethylene), poly(oxyethyleneoxyterephthaloyl), poly(oxytetramethyleneoxyterephthaloyl), and poly(amides). Common copolymers for use in this invention would be at least one of the group: acrylonitrile-butadiene-styrene copolymer (ABS), olefin-modified styrene-acrylonitrile copolymer (OSA), acrylonitrile-chlorinated polyethylene-styrene copolymer (ACS), acrylic-styrene-acylonitrile copolymer (ASA), and acetal copolymer. Further examples of specific polymer structures in each of the above chemical classes are tabulated in the "Polymer Handbook", Third Edition, J. Brandrup, E. H. Immergut, Eds., Wiley-Interscience (1989).

The present invention will now be further illustrated by certain examples which are provided for purposes of illustration only and are not intended to limit the present invention.

EXAMPLES

In this first group of examples, the monomer used is 2-propenamide [79-06-1],

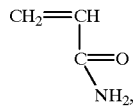

and the product made is poly(lignin-g-(1-amidoethylene)).

Example 1

A total of 0.50 g of aspen lignin and 0.62 g of calcium chloride were placed in a 150 mL beaker containing 11.28 g of dimethylsulfoxide. The mixture was stirred and bubbled with nitrogen ($N_2$) for about 22 minutes before 0.482 mL of 30 percent, aqueous hydrogen peroxide from Fisher Chemical Company were added to the reaction mixture. $N_2$ was bubbled through the reaction mixture for about 4 more minutes and 3.20 g of 2-propenamide in 10.0 g of dimethylsulfoxide, which had been stirred together and nitrogen-saturated for about 20 minutes, were then added. After about 2 minutes of stirring and $N_2$ bubbling, the flask was stoppered and placed in a 30° C. bath for 2 days. The chloride content of the reaction mixture was 1.519 weight percent. The solids content of the reaction mixture was 16.51 weight percent. The reaction was then terminated by adding 0.5 mL of 1% hydroquinone and 100 mL of water thereto. The aqueous solution was dialyzed against pure water using a 3,500-upper-molecular-weight- permeable, dialysis membrane for 3 days. The dilute reaction product from the dialysis tube was recovered by freeze drying and found to weigh 3.48 g. The product was labeled 26-14-1. Yield=94.05 weight percent.

The materials can be made in a broad spectrum of compositions and molecular sizes, as shown by the data of Table 5. These reactions were all run on lignin recovered from mixed softwood chips that were heated in 1 molar sodium hydroxide containing 0.115 molar sodium sulfide. After heating, the "black liquor" from this extraction was acidified with hydrochloric acid and carbon dioxide to precipitate the lignin.

Table 6 shows synthesis data for the preparation of poly(lignin-g-(1-amidoethylene)) from many different lignins. Samples 6-1, 6-5 and 6-6 are kraft pine lignin grafted in a reaction coinitiated with either calcium chloride (6-5,6) or sodium chloride(6-1). Lignin used in these studies is a kraft, pine lignin. Sample 6-2 is a reaction run with a steam-exploded, methanol-extracted, aspen lignin provided by the Solar Energy Research Institute of Golden, Colo. Samples 6-3 and 6-4 are results on a yellow poplar lignin provided by BioRegional Energy Associates of Floyd, Va. and recovered by steam exploding the wood, extracting with alkali, and precipitating with mineral acid.

TABLE 5

Use of Different Salts with Hydrogen Peroxide to Initiate the Grafting Reaction.[a]

| Sample Number | Reactants (g) | | | | Product Data (wt. %) | |
|---|---|---|---|---|---|---|
| | Lignin (g) | Salt Used | Salt (g) | 2-Propen amide (g) | Yield | Lignin in the Copolymer |
| 5-1(2) | 0.4918 | KBr | 1.5529 | 2.8541 | 29.28 | 19.89 |
| 5-2(3) | 0.5051 | KBr | 1.3549 | 1.4581 | 25.47 | 46.62 |
| 5-3(4) | 0.51 | LiF | 0.34 | 4.35 | 43.41 | 21.88 |
| 5-4(5) | 0.50 | LiF | 0.30 | 2.82 | 89.15 | 15.71 |
| 5-5(6) | 0.49 | LiF | 0.28 | 1.45 | 90.21 | 29.62 |
| 5-6(7) | 0.50 | $CaCl_2$ | 1.52 | 4.31 | 89.8 | 7.70 |
| 5-7(8) | 0.50 | $CaCl_2$ | 1.52 | 2.87 | 78.4 | 10.68 |
| 5-8(9) | 0.50 | $CaCl_2$ | 1.52 | 1.44 | 82.6 | 16.91 |
| 5-9(10) | 0.50 | KBr | 1.52 | 4.31 | 89.3 | 11.56 |
| 5-10(11) | 0.50 | KBr | 1.52 | 2.87 | 84.10 | 18.17 |
| 5-11(12) | 0.50 | KBr | 1.52 | 1.44 | 61.26 | 30.29 |
| 5-12(13) | 0.50 | NaBr | 1.52 | 4.31 | 83.52 | 15.31 |
| 5-13(14) | 0.50 | NaBr | 1.52 | 2.87 | 64.54 | 13.66 |
| 5-14(15) | 0.50 | NaBr | 1.52 | 1.44 | 63.45 | 24.45 |

[a] = 27.5 mL of DMSO was charged to each reaction.

Samples 6-7 to 9 were run on spruce lignin provided by Barbara Nicklas and prepared by Dr. Thiel of Organocel Gesellschaft fur Zellstoff und Umwelttechnik mbH, West Germany. It was obtained by delignification of spruce pulp in methanol-water at 195° C. and methanol-water-caustic at 170° C. Sample 6-10 to 12 were run on beech/spruce lignin provided by Barbara Nicklas of the Forstbotanisches Instutut of Der Universitat Göttingen, Germany. It was obtained by delignification of beech and spruce pulp in methanol-water-NaOH at 170° C. Sample 6-13 to 15 were run on kraft, bagasse lignin provided by Dr. Jia-xiang Chen of the Department of Paper Science and Engineering, South China Institute of Technology, Guangzhou, China It was the acid precipitated product of bagasse, kraft, black liquor. Sample 6-16 and 17 were run on HCl-extracted, oak or mixed hardwood lignin supplied by Dr. Douglas Gardner, Division of Forestry, College of Agriculture and Forestry, West Virginia University.

TABLE 6

Poly(Lignin-G-(1-Amidoethylene)) Formed From Various Lignins and with Different Coinitiators.

| Sample Number | Reactants (g) | | | | | Yield (g/wt. %) | Lignin Type |
|---|---|---|---|---|---|---|---|
| | Lignin | 2-Prop-ene amide | Chloride Salt[a] | Hydroperoxide (ml) | Solvent | | |
| 6-1(16) | 0.50 | 3.21 | 0.68 | 0.482 | 21.28 | 3.46/93.3 | Kraft |
| 6-2(17) | 0.50 | 3.20 | 0.62 | 0.482 | 21.28 | 3.48/94.05 | I-O-Tech |
| 6-3(18) | 0.51 | 3.21 | 0.62 | 0.482 | 21.30 | 2.48/66.67 | Poplar |
| 6-4(19) | 0.50 | 3.20 | 0.62 | 0.482 | 21.33 | 3.50/86.48 | Poplar |
| 6-5(20) | 0.50 | 3.27 | 0.64 | 0.462 | 21.39 | 3.20/84.88 | Kraft |
| 6-6(21) | 0.50 | 3.22 | 0.63 | 0.482 | 21.29 | 3.26/87.63 | Kraft |
| 6-7(22) | 0.5004 | 4.3185 | 1.5195 | 0.80 | 30.29 | 3.97/82.4 | Organosolve |
| 6-8(23) | 0.4955 | 2.8575 | 1.5199 | 0.80 | 30.29 | 2.74/81.7 | Organosolve |
| 6-9(24) | 0.5005 | 1.4360 | 1.5201 | 0.80 | 30.29 | 1.38/71.3 | Organosolve |
| 6-10(25) | 0.5014 | 4.3176 | 1.5216 | 0.80 | 30.29 | 4.69/97.3 | Organosolve |
| 6-11(26) | 0.5027 | 2.8686 | 1.5221 | 0.80 | 30.29 | 3.12/92.5 | Organosolve |
| 6-12(27) | 0.5053 | 1.4353 | 1.5173 | 0.80 | 30.29 | 1.68/86.6 | Organosolve |
| 6-13(28) | 0.5032 | 4.3166 | 1.5211 | 0.80 | 30.29 | 3.15/65.4 | BagasseKraft |
| 6-14(29) | 0.5021 | 2.8665 | 1.5217 | 0.80 | 30.29 | 2.39/71.0 | BagasseKraft |
| 6-15(30) | 0.4969 | 1.4350 | 1.5212 | 0.80 | 30.29 | 1.19/61.6 | BagasseKraft |
| 6-16a(31) | 0.2183 | 1.2251 | 0.2045 | 0.32 | 9.17 | .7594/53.3 | HCl-Oak |
| 6-16b | Product 16a is water soluble. | | | Insoluble fraction = | | 0.180/12.5 | |
| 6-17a(32) | 0.2013 | 1.2280 | 0.2118 | 0.32 | 8.86 | 1.001/70.4 | HCl-M.Hrdwd |
| 6-17b | Product 17a is water soluble. | | | Insoluble fraction = | | 0.233/16.4 | |
| 6-18(33) | 0.5015 | 4.3216 | 1.5201 | 0.80 | 30.29 | 4.33/89.8 | Glycol Lig. |
| 6-19(34) | 0.4995 | 2.8690 | 1.5198 | 0.80 | 30.29 | 2.64/78.4 | Glycol Lig. |
| 6-20(35) | 0.5002 | 1.5185 | 1.5185 | 0.80 | 30.29 | 1.60/82.6 | Glycol Lig. |
| 6-21(36) | 0.5011 | 4.3117 | 1.5213 | 0.80 | 30.29 | 0.61/12.67 | Corn |
| 6-22(37) | 0.5016 | 2.8683 | 1.5219 | 0.80 | 30.29 | 1.48/43.92 | Corn |
| 6-23(38) | 0.5000 | 1.4350 | 1.4350 | 0.80 | 30.29 | 0.55/28.42 | Corn |
| 6-24(39) | 0.2021 | 1.728 | 0.6085 | 0.80 | 30.29 | 1.55/80.31 | Spruce |
| 6-25(40) | 0.1987 | 1.1783 | 0.6078 | 0.80 | 30.29 | 1.20/87.15 | Spruce |
| 6-26(41) | 0.2003 | 0.5763 | 0.6071 | 0.80 | 30.29 | 0.37/47.64 | Spruce |
| 6-27(42) | 0.2007 | 1.7269 | 0.6022 | 0.80 | 30.29 | 1.12/58.1 | Spruce |
| 6-28(43) | 0.1994 | 1.1773 | 0.6064 | 0.80 | 30.29 | 1.35/98.06 | Spruce |
| 6-29(44) | 0.1995 | 0.6044 | 0.6044 | 0.80 | 30.29 | 0.43/55.69 | Spruce | a. The same number of moles of chloride ion is used in sample 6-1 and samples 6-2 to 4. Sample 6-1 received sodium chloride while samples 6-2 to 4 received calcium chloride.

Samples 6-18 to 20 were prepared using a lignin extracted with 1,2-ethanediol by Ronald W. Thring of the Universite De Sherbrooke, Sherbrooke, Canada J1K 2R1. Samples 6-21 to 23 were prepared from corn stalk lignin provided by Dr. Zenat Adeeb, Cellulose and Paper Laboratory, National Research Centre, A.R. of Egypt, Sh. El-Tahrir, Dokki-Carro, Egypt. The lignin was extracted by cooking corn stalks at 160° C. for 1 hour in aqueous, 25% sodium hydroxide. Samples 6-24 to 29 were prepared from spruce lignins provided by Dr. M. Ya. Zarubin, Dr. S. M. Shevchenko, and Dr. A. B. Nikandrov of the Leningrad Forest Technical Academy, Institutsky per. 5, Leningrad 194018, USSR. Samples 6-24 to 26 used lignin from spruce pulp formed by oxygen pulping of spruce chips in a 40 to 60 by volume mixture of water-(2-propanone) at 150° C. The lignin was precipitated by 2-propanone distillation. Samples 6-27 to 29 used lignin from spruce pulp formed by oxygen pulping of spruce chips in a 40 to 60 by volume mixture of water-(ethanoic acid) at 150° C. The lignin was precipitated by ethanoic acid distillation.

In examples 45 to 54, the monomers used are 2-propenamide 179-06-1] and sodium 2-methyl-2N-propenamidopropane sulfonate [15214-89-8],

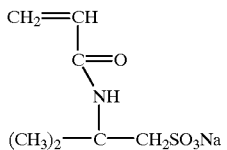

and the product made is poly(lignin-g-((1-amidoethylene)-co-1-(sodium(2-methylprop-2N-yl-1-sulfonate))amidoethylene)).

In examples 55 to 59, the monomers used are 2-propenamide [79-06-1] and dimethyldiprop-2-enylammonium chloride,

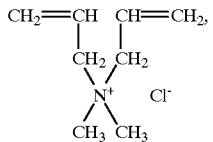

and the product made is poly(lignin-g-((1-amidoethylene)co-(methylene 1N,1N-dimethyl-1-ammoniumcyclopenta-3,4-diyl chloride methylene))).

Other cationic copolymers are based on (3-oxy-4-oxo-5-methylhex-5-enyl)trimethylammonium methylsulfate, [6891-44-7], and (3-oxy-4-oxo-5-methylhex-5-enyl)trimethylammonium chloride, [5039-78-1]. These two monomers were used to make two cationic copolymers which will be referred to as poly(lignin-g-((1-amidoethylene)-r-(1-methyl-1-(1-oxo-2-oxybutylenetrimethylammonium)ethylene methylsulfate))) and poly(lignin-g-((1-amidoethylene)-r-(1-methyl-1-(1-oxo-2-oxybutylenetrimethylammonium)ethylene chloride))).

A series of reactions, similar to those run with the diene monomer, were run with (3-oxy-4-oxo-5-methylhex-5-enyl) trimethylammonium methylsulfate and are shown as examples 60 to 64 of Table 7. The notations for Table 7 are:

A=2-methyl-2N-propenamidopropane sulfonic acid.

~=An organic hydroperoxide was used to make these samples. Examples 45 to 51: Values are weight of 1,4-dioxa-2-hydroperoxycyclohexane in g. Examples 52 to 54: Values are amount of aqueous solution of 1,2-dioxy-3,3-dimethylbutane in mL, equivalent/mL=$7.23 \times 10^{-3}$.

B=dimethyldiprop-2-enylammonium chloride. The concentration of $Na_2EDTA$ in each reaction containing this monomer is 200 ppm based on cationic monomer.

C=(3-oxy-4-oxo-5-methylhex-5-enyl) trimethylammonium methylsulfate $g$=measurement made in grams. $m$=measurement made in milliliters.

E=30% hydrogen peroxide (equivalent weight: 8.383 meq/mL) in mL.

and the product made is poly(lignin-g-((1-amidoethylene)-co-1-(2N-methyl-2-imino-1-oxopropyl)ethylene)).

Example 65

This reaction was run with the procedure of Example 1 but the amounts for materials placed in the flask before and during nitrogen saturation were: 0.50 g of lignin, 0.63 g of calcium chloride, 11.28 g of dimethylsulfoxide, and 0.482 mL of hydrogen peroxide. The amount of monomer used was 4.52 g of 2N-methyl-2-imino-3-oxopent-4-ene. After 2 days, the reaction was terminated by adding 0.5 mL of 1% hydroquinone and 100 mL of water thereto. The solution remained single phase during this dilution and smelled sweet. The dilute solution was dialyzed for 3 days. The solids were recovered by freeze drying and found to weigh 1.92 g. The product was labeled 26-16-1. Yield=38.24 weight percent.

In the following examples, the monomers used are 2-propenamide [79-06-1] and a 2-methyl-3-oxo-4-oxybut-1-ene-(p-ethoxy-(3*p+3)-ol),

TABLE 7

Synthesis Data and Physical Characteristics of Graft Terpolymer

| Example Number | Lignin (g) | 2-propenamide (g) | Second Monomer (g) | Ce(4+) solution (mL) | Dimethylsulfoxide (g or mL) | CaCl$_2$ (g) | Peroxide (g or mL) | Yield (wt. %) |
|---|---|---|---|---|---|---|---|---|
| 45 | 0.50 | 1.60 | 4.66$^A$ | 0.15 | 20$^m$ | 0.50 | 0.15$^~$ | 70.12 |
| 46 | 0.50 | 1.60 | 4.66$^A$ | 0.15 | 50$^m$ | 0.50 | 0.15$^~$ | 86.98 |
| 47 | 0.50 | 1.60 | 4.66$^A$ | 0.15 | 50$^m$ | 0.50 | 0.25$^~$ | 78.40 |
| 48 | 0.50 | 1.60 | 4.66$^A$ | 0.15 | 40$^m$ | 0.50 | 0.40$^~$ | 69.82 |
| 49 | 0.50 | 1.60 | 5.16$^A$ | 0.15 | 30$^m$ | 0.50 | 0.15$^~$ | 78.79 |
| 50 | 0.50 | 1.60 | 5.16$^A$ | 0.15 | 30$^m$ | 0.50 | 0.15$^~$ | 77.27 |
| 51 | 0.50 | 1.60 | 4.66$^A$ | 0.15 | 30$^m$ | 0.50 | 0.15$^~$ | 87.28 |
| 52 | 0.50 | 2.58 | 1.87$^A$ | 0.15 | 30$^m$ | 0.50 | 0.39$^~$ | 67.89 |
| 53 | 0.50 | 2.56 | 1.86$^A$ | 0.15 | 30$^m$ | 0.53 | 0.39$^~$ | 79.49 |
| 54 | 4.39 | 21.98 | 15.99$^A$ | 1.28 EDTA mmole | 219$^m$ | 4.35 | 3.35$^~$ | 91.02 |
| 55 | 0.66 | 2.35 | 1.03$^B$ | 1.30 | 29.28$^g$ | 0.33 | 0.65$^E$ | 68.43 |
| 56 | 0.65 | 2.25 | 1.25$^B$ | 1.50 | 28.23$^g$ | 0.33 | 0.65$^E$ | 68.43 |
| 57 | 0.66 | 2.07 | 1.55$^B$ | 1.90 | 28.82$^g$ | 0.33 | 0.65$^E$ | 51.37 |
| 58 | 0.66 | 1.93 | 1.88$^B$ | 2.30 | 33.25$^g$ | 0.33 | 0.65$^E$ | 49.61 |
| 59 | 0.68 | 2.69 | —$^B$ | — | 25.26$^g$ | 0.34 | 0.65$^E$ | 95.37 |
| 60 | 0.67 | 2.26 | 1.58$^C$ | — | 29.41$^g$ | 0.33 | 0.65$^E$ | 63.40 |
| 61 | 0.68 | 1.62 | 3.17$^C$ | — | 29.37$^g$ | 0.34 | 0.65$^E$ | 61.83 |
| 62 | 0.67 | 1.34 | 4.74$^C$ | — | 29.16$^g$ | 0.33 | 0.65$^E$ | 69.62 |
| 63 | 0.68 | 0.63 | 6.36$^C$ | — | 29.34$^g$ | 0.34 | 0.65$^E$ | 67.78 |
| 64 | 0.67 | — | 7.84$^C$ | — | 29.42$^g$ | 0.33 | 0.65$^E$ | 32.19 |

In the next example, the monomers used are 2-propenamide, [79-06-1], and N,N-dimethyl-2-propenamide, [2680-03-7],

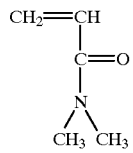

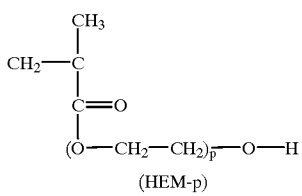

(HEM-p)

and the product made is poly(lignin-g-((1-amidoethylene)-co-1-(1-oxo-2-oxy-p-ethoxy-(3*p+3)-ol)ethylene)). Table 18 shows the reaction results.

TABLE 8

Synthesis of Poly(lignin-g-(2-propenamide-co-polyol)).[a]
(Five or Ten oxyethylene units per propenoic repeat unit)

| Sample Number | Lignin (g) | 2-propen-amide (g) | Polyol Type | Amount of polyol (g) | Mole Ratio of 2-prop. to Polyol |
|---|---|---|---|---|---|
| 28-22-1(66) | 1.51 | 2.55 | HEM-5 | 11.04 | 0.99 |
| 28-22-2(67) | 1.51 | 3.51 | HEM-5 | 10.10 | 1.50 |
| 28-22-3(68) | 1.51 | 3.76 | HEM-5 | 8.70 | 1.86 |
| 28-22-4(69) | 1.51 | 6.53 | HEM-5 | 7.02 | 4.00 |
| 28-31-1(70) | — | 2.56 | HEM-5 | 11.04 | 0.99 |
| 28-26-1(71) | 1.50 | 1.60 | HEM-10 | 11.90 | 0.99 |
| 28-26-2(72) | 1.50 | 2.19 | HEM-10 | 11.25 | 1.44 |
| 28-26-3(73) | 1.50 | 3.23 | HEM-10 | 10.26 | 2.32 |
| 28-26-4(74) | 1.50 | 5.14 | HEM-10 | 9.73 | 3.91 |
| 28-31-2(75) | — | 1.59 | HEM-10 | 11.90 | 0.99 | a = Amount of various raw materials charged into the reaction: 1.5 g $CaCl_2$, 2.4 mL of $H_2O_2$ and 66 mL of DMSO were charged to all the reactions.

In the following examples, the monomer used is 1-phenylethene, [100-42-5].

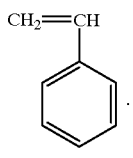

1-Phenylethene

Example 76

A sample of 300 g of clarifier sludge from the Masonite Corporation, Hardboard Group, P.O. Box 1048, South 4th Avenue, Laurel, Miss. 39441-1048 was extracted with aqueous, 2 M NaOH. The dissolved lignin was precipitated in aqueous HCl and recovered by filtration. A total of 4.00 g of this extracted, hardwood lignin and 3.00 g of calcium chloride were placed in a 250 mL conical flask containing 30.18 g of dimethylsulfoxide. The solution was cooled to 30° C. to minimize the possibility of explosion or foaming. This solution was stir-bubbled with nitrogen ($N_2$) for about 10 minutes before 4.0 mL of 29.86 percent, aqueous hydrogen peroxide were added to the reaction mixture. $N_2$ was bubbled through the reaction mixture and it was stirred for about 5 more minutes. Next, 14.07 g of 1-phenylethene were added to the reaction. The polymerizable material in the reaction contained 22.1 weight percent hardwood lignin. After a short period of stirring and bubbling $N_2$ through the reaction mixture, the flask was stoppered, placed in a 30° C. bath for 2 days, and stirred continuously. Within an hour, the unique reactivity of this lignin in this chemistry was evident. The reaction thickened and became turbid. These changes often take 14 or more hours with other lignins. By the end of the reaction, this sample was a yellow-brown lump. The reaction was then terminated by adding 7 mL of 1% hydroquinone thereto. The reaction mixture was poured into 1.0 L of water and precipitated. The reaction product from the precipitation was recovered by filtration and found to weigh 17.11 g. The product was labeled 35-127-1. Yield=94.69 weight percent.

In these reactions, both lignin and lignin-containing material were used to make thermoplastic materials. Data for a spectrum of reactions run to optimize yield and create samples of different molecular weight and composition are given in Table 9. All of these reactions were stirred at a rate of about 4 Hz throughout the synthesis and were conducted according to the procedure of Example 76.

TABLE 9

Copolymerization Reactions of Lignin and 1-Phenylethylene.

| | Reactants (g) | | | | | |
|---|---|---|---|---|---|---|
| Sample Number | Lignin | 1-Phenyl ethene | $CaCl_2$ | $H_2O_2$ (mL) | Solvent | Yield (g)/(wt. %) |
| 15-16(77) | 2.00 | 18.76 | 2.02 | 1.0 | 20.04 | 17.80/85.74 |
| 15-20(78) | 2.01 | 18.78 | 2.02 | 5.0 | 20.02 | 18.53/89.13 |
| 15-21(79) | 3.03 | 18.78 | 2.00 | 2.0 | 20.00 | 19.14/87.76 |
| 15-22(80) | 2.00 | 18.76 | 1.01 | 2.0 | 20.10 | 18.84/90.75 |
| 15-26(81) | 2.01 | 4.69 | 2.04 | 2.0 | 20.01 | 5.68/84.78 |
| 15-27(82) | 2.01 | 9.39 | 2.02 | 2.0 | 20.00 | 10.42/91.40 |
| 15-28(83) | 2.01 | 14.07 | 2.03 | 2.0 | 20.10 | 14.95/92.79 |
| 15-30(84) | 2.02 | 23.45 | 2.04 | 2.0 | 20.07 | 23.76/93.29 |
| 15-34(85) | 8.00 | 28.15 | 8.00 | 8.0 | 40.02 | 33.16/91.73 |
| 15-35(86) | 8.04 | 18.76 | 8.00 | 8.0 | 40.03 | 24.14/90.07 |
| 15-36(87) | 8.01 | 9.39 | 8.00 | 8.0 | 40.10 | 15.45/88.79 |
| 15-37(88) | 2.01 | 18.76 | 2.03 | 2.0 | 20.01 | 19.52/93.98 |
| 15-38(89) | 8.01 | 9.38 | 6.28 | 8.0 | 40.00 | 15.89/91.37 |
| 15-39(90) | 8.02 | 18.76 | 6.02 | 8.0 | 40.0 | 24.93/90.14 |

These products have been shown to be poly(lignin-g-(1-phenylethylene))-containing materials by a series of solubility and extraction tests and are formed with 90% or more grafting efficiency for lignin.

In examples 91 to 95 of Table 10, the monomers used were 2-propene nitrile, [107-13-1] and 2-propenamide [79-06-11]. In examples 96 to 100 of Table 10, the monomer used was 2-propene nitrile, [107-13-1].

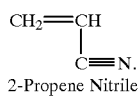

2-Propene Nitrile

In examples 101 to 103 of Table 10, the monomer used was 2-methyl-1,3-butadiene, [78-79-5].

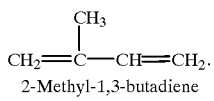

2-Methyl-1,3-butadiene

In examples 104 to 112 of Table 10, the monomer used was 2-methyl-2-oxy-3-oxopent-4-ene, 180-62-6].

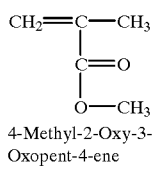

4-Methyl-2-Oxy-3-Oxopent-4-ene

TABLE 10

Copolymerization Reactions of Lignin and Ethene Monomers

| | Reactants (g) | | | | | |
|---|---|---|---|---|---|---|
| Sample Number | Lignin | Monomer | $CaCl_2$ | $H_2O_2$ (mL) | Solvent | Yield (g/wt. %) |
| 26-74-2(91) | 4.10 | 9.35/0.0* | 3.05 | 4.00 | 20.04 | 13.86/103.0 |
| 19-145-9(92) | 0.50 | 0.35/4.17 | 0.5 | 0.53 | 28.91 | 4.82/96.4 |
| 19-146-8(93) | 0.50 | 0.78/3.74 | 0.5 | 0.53 | 28.91 | 4.91/97.8 |
| 19-147-7(94) | 0.50 | 1.19/3.33 | 0.5 | 0.53 | 28.91 | 3.50/69.7 |
| 19-150-8(95) | 0.50 | 0.79/3.75 | 0.5 | 0.53 | 28.91 | 3.28/65.1 |
| 26-74-2(96) | 4.10 | 9.35/0.0 | 3.05 | 4.0 | 20.04 | 13.86/103.0 |
| 26-74-3(97) | 3.95 | 6.08/0.0 | 3.07 | 4.0 | 20.07 | 9.83/98.0 |
| 26-74-4(98) | 4.05 | 3.13/0.0 | 3.02 | 4.0 | 20.57 | 6.34/88.30 |
| 26-74-5(99) | 4.02 | 6.15/0.0 | 3.05 | 4.0 | 25.02 | 10.14/99.71 |
| 26-74-6(100) | 4.00 | 6.16/0.0 | 2.51 | 5.0 | 20.01 | 9.29/94.29 |
| 26-71-2(101) | 4.11 | 9.32 | 3.02 | 4.0 | 20.29 | 4.21/31.3 |
| 26-71-3(102) | 4.01 | 3.14 | 3.05 | 4.0 | 20.32 | 4.39/61.4 |
| 26-71-4(103) | 3.98 | 6.27 | 3.07 | 4.0 | 21.36 | 3.71/36.2 |
| 26-94-2(104) | 4.00 | 17.17 | 3.03 | 4.48 | 20.04 | 19.54/92.30 |
| 26-94-3(105) | 4.03 | 11.57 | 3.09 | 4.48 | 20.11 | 15.29/98.01 |
| 26-94-4(106) | 3.97 | 6.37 | 3.06 | 4.48 | 20.27 | 9.69/93.71 |
| 26-94-5(107) | 4.00 | 11.78 | 2.98 | 4.48 | 20.06 | 16.2/102.67 |
| 26-94-6(108) | 4.05 | 11.53 | 2.57 | 5.60 | 20.35 | 15.69/100.71 |
| 26-94-7(109) | 8.00 | 6.1 | 3.03 | 4.70 | 30.42 | 13.53/95.96 |
| 26-94-8(110) | 8.1 | 2.41 | 3.08 | 4.48 | 30.21 | 9.86/93.82 |
| 26-94-9(111) | 7.99 | 17.52 | 3.11 | 8.96 | 30.23 | 24.22/94.94 |
| 26-94-10(112) | 2.00 | 18.07 | 2.06 | 4.48 | 20.11 | 20.63/102.79 |

*First number = weight of 2-propene nitrile added and second number = weight of 2-propenamide added.

The reactions of Table 10 were stirred continuously at rates specific for each monomer. Success of the synthesis depends on constant agitation. These data clearly show that numerous, different graft copolymers can be made by conducting this reaction with lignin and monomers that react by free radical polymerization.

Data for a spectrum of reactions run to optimize yield and create samples of different, grafted, lignin-containing substance are given in Table 11. The monomer used in these reactions was 1-phenylethene, [100-42-5]. All of these reactions were stirred at a rate of about 4 Hz throughout the synthesis. Four samples of wood were prepared from a mixture of white spruce and balsam fir chips contaminated with 0 to 8 weight percent poplar. The first sample was ground under a stone wheel and the 96 weight percent of the input wood that was recovered was dried and labeled 40-18-1, Ground Wood Pulp. The second sample was produced by pressing the chips through a pressurized, two-stage refiner. Yield was 95 weight percent and the pulp was labeled 40-19-1, Thermomechanical Pulp. The third sample was made by impregnating the chips with 2.2 weight percent, aqueous sodium sulfite at pH=8.0 for 2 minutes at 120° C. The chips were then ground in a pressurized refiner to produce 93 percent yield pulp, which was labeled 40-20-1, Chemithermomechanical Pulp. The fourth sample was made by digesting the chips with 10 weight percent $SO_2$, aqueous sodium bisulfite at pH=6.0 for 120 minutes at 160° C. The pulp constituted 87 percent of the wood used and was labeled 40-21-1, Very High Yield Sulfite Pulp. A fifth sample was made by passing aspen chips through a refiner to produce a refiner mechanical pulp, labeled 26-44-1, Refiner Mechanical Pulp. A final sample was made by passing chips made from a mixture of 70 percent spruce and 30 other wood through a mechanical grinder It was labeled 40-22-1, Mechanical Pulp. All pulps were dried at room temperature before storage. Sample 26-44-1 was used to make products numbered 40-8-1 to 6; 40-10-1 to 6; and 40-14-1 to 6. Sample 40-22-1- was used to make 40-26-1 to 6 and 40-50-1 to 3. Sample 40-20-1 was used to make 28-1 to 6. Sample 40-18-1 was used to make 40-30-1 to 6 and 40-50-4 to 6. Sample 40-19-1 was used to make 40-32-1 to 6. Sample 40-21-1 was used to make 40-34-1 to 7. The products numbered 40-26-1 to 6 and 40-38-1 to 6 were made with another batch of chemithermomechanical pulp and ground wood pulp, respectively. All the above wood pulps had a lignin content of 25 to 29 weight percent. The data of Table 11 show clearly that all lignin-containing materials can be used as a reaction site for the production of a polymeric product. All structured pieces of a vascular plant are lignin-containing materials and thus can be used as a reaction site for this reaction.

In all of the reactions of Table 11, the lignin-containing material was stirred for at least 24 hours before the reaction was initiated. If the lignin-containing material is not mixed in the reaction until uniformly dispersed, low conversion of monomer to polymer and reduced levels of grafting may occur. Further, the reaction temperature should be between 20 and 50° C. and the weight percent halide ion in the reaction mixture should be at least 0.1 weight percent to insure high yield from the reaction.

TABLE 11

Copolymerization Reactions of Lignin-Containing Materials and 1-Phenylethylene.

| Sample Number | Reactants (g) 1-Phenyl ethene | A | $CaCl_2$ | $H_2O_2$ (ml) | Solvent | Yield (g)/(wt. %) | Type of Lignin-Containing Material |
|---|---|---|---|---|---|---|---|
| 40-10-3(113) | 4.67 | 2.02 | 2.04 | 3.0 | 60.06 | 3.09/46.19 | RefineMech.Pulp |
| 40-10-2(114) | 6.02 | 2.04 | 2.03 | 3.0 | 60.05 | 4.55/56.45 | RefineMech.Pulp |
| 40-8-1(115) | 8.00 | 2.03 | 2.01 | 3.0 | 60.16 | 7.75/77.27 | RefineMech.Pulp |
| 40-8-2(116) | 11.38 | 2.04 | 2.00 | 3.0 | 60.11 | 10.17/75.78 | RefineMech.Pulp |
| 40-8-3(117) | 18.00 | 2.03 | 2.02 | 3.0 | 60.15 | 12.97/64.75 | RefineMech.Pulp |
| 40-8-4[a](118) | 8.03 | 2.00 | 2.01 | 3.0 | 60.02 | 8.07/73.16 | RefineMech.Pulp |
| 40-8-5[a](119) | 11.34 | 2.01 | 2.02 | 3.0 | 60.09 | 8.56/59.65 | RefineMech.Pulp |
| 40-8-6[a](120) | 18.00 | 2.01 | 2.01 | 3.0 | 60.03 | 4.67/22.22 | RefineMech.Pulp |
| 40-14-1(121) | 4.67 | 2.00 | 2.01 | 3.0 | 40.12 | 5.45/81.71 | RefineMech.Pulp |
| 40-14-2(122) | 6.00 | 2.03 | 2.02 | 3.0 | 40.07 | 5.14/64.01 | RefineMech.Pulp |
| 40-14-3(123) | 8.01 | 2.04 | 2.01 | 3.0 | 40.03 | 8.57/85.27 | RefineMech.Pulp |
| 40-14-4(124) | 11.37 | 2.00 | 2.04 | 3.0 | 40.05 | 10.81/80.85 | RefineMech.Pulp |
| 40-14-5(125) | 18.06 | 2.01 | 2.04 | 3.0 | 40.00 | 6.98/34.78 | RefineMech.Pulp |
| 40-14-6(126) | 3.53 | 2.04 | 2.01 | 3.0 | 40.02 | 4.15/74.51 | RefineMech.Pulp |
| 40-26-1(127) | 3.53 | 2.00 | 2.03 | 3.0 | 51.32 | 4.51/81.56 | MechanicalPulp |
| 40-26-2(128) | 4.67 | 2.00 | 2.04 | 3.0 | 53.73 | 4.91/73.61 | MechanicalPulp |
| 40-26-3(129) | 6.00 | 2.01 | 2.04 | 3.0 | 50.03 | 6.40/79.90 | MechanicalPulp |
| 40-26-4(130) | 8.00 | 2.01 | 2.05 | 3.0 | 50.02 | 8.37/83.62 | MechanicalPulp |
| 40-26-5(131) | 11.37 | 2.02 | 2.03 | 3.0 | 50.04 | 11.33/84.62 | MechanicalPulp |
| 40-26-6(132) | 18.06 | 2.04 | 2.05 | 3.0 | 50.52 | 16.29/81.04 | MechanicalPup |
| 40-28-1(133)[e] | 3.53 | 2.01 | 2.00 | 3.0 | 50.02 | 2.87/51.81 | ChemTherMePulp |
| 40-28-2(134) | 7.67 | 2.00 | 2.02 | 3.0 | 50.03 | 3.56/53.37 | ChemTherMePulp |
| 40-28-3(135) | 6.00 | 2.05 | 2.02 | 3.0 | 50.00 | 4.96/61.61 | ChemTherMePulp |
| 40-28-4(136) | 8.00 | 2.00 | 2.03 | 3.0 | 50.01 | 6.09/60.90 | ChemTherMePulp |
| 40-28-5(137) | 11.37 | 2.01 | 2.05 | 3.0 | 50.00 | 8.48/63.38 | ChemTherMePulp |
| 40-28-6(138) | 18.06 | 2.03 | 2.00 | 3.0 | 50.00 | 6.40/31.86 | ChemTherMePulp |
| 40-30-1(139)[e] | 3.55 | 2.02 | 2.03 | 3.0 | 50.01 | 3.62/64.99 | GroundWoodPulp |
| 40-30-2(140) | 4.64 | 2.01 | 2.04 | 3.0 | 50.02 | 3.94/59.25 | GroundWoodPulp |
| 40-30-3(141) | 6.05 | 2.00 | 2.01 | 3.0 | 50.02 | 4.95/61.49 | GroundWoodPulp |
| 40-30-4(142) | 8.00 | 2.01 | 2.02 | 3.0 | 50.08 | 7.28/72.73 | GroundWoodPulp |
| 40-30-5(143) | 11.37 | 2.01 | 2.00 | 3.0 | 50.01 | 9.12/68.16 | GroundwoodPulp |
| 40-30-6(144) | 18.10 | 2.04 | 2.03 | 3.0 | 50.03 | 12.53/62.21 | GroundWoodPulp |
| 40-32-1(145) | 3.58 | 2.00 | 2.01 | 3.0 | 50.05 | 3.39/60.75 | ThermomechPulp |
| 40-32-2(146) | 4.64 | 2.02 | 2.01 | 3.0 | 50.04 | 4.03/60.51 | ThermomechPulp |
| 40-32-3(147) | 6.05 | 2.00 | 2.02 | 3.0 | 50.03 | 5.25/65.22 | ThermomechPulp |
| 40-32-4(148) | 8.08 | 2.00 | 2.00 | 3.0 | 50.03 | 7.54/74.80 | ThermomechPulp |
| 40-32-5(149) | 11.35 | 2.02 | 2.01 | 3.0 | 50.00 | 10.26/76.74 | ThermomechPulp |
| 40-32-6(150) | 18.12 | 2.00 | 2.01 | 3.0 | 50.16 | 11.72/58.25 | ThermomechPulp |
| 40-34-1(151) | 3.58 | 2.02 | 2.02 | 3.0 | 60.06 | 3.97/70.89 | VeryHighYldSulf |
| 40-34-2(152) | 4.67 | 2.01 | 2.01 | 3.0 | 50.12 | 4.67/69.91 | VeryHighYldSulf |
| 40-34-3(153) | 6.04 | 2.03 | 2.01 | 3.0 | 50.07 | 6.15/76.21 | VeryHighYldSulf |
| 40-34-4(154) | 8.06 | 2.02 | 2.07 | 3.0 | 50.00 | 8.04/79.76 | VeryHighYldSulf |
| 40-34-5(155) | 11.34 | 2.01 | 2.02 | 3.0 | 50.03 | 10.58/79.21 | VeryHighYldSulf |
| 40-34-6(156) | 18.13 | 2.01 | 2.02 | 3.0 | 50.05 | 15.81/78.50 | VeryHighYldSulf |
| 40-34-7(157) | 8.06 | 2.01 | 2.00[b] | 3.0 | 50.06 | 8.08/80.24 | VeryHighYldSulf |
| 40-36-1(158)[f] | 3.57 | 2.02 | 2.01 | 3.0 | 50.02 | 4.00/71.56 | ChemTherMePulp |
| 40-36-2(159) | 4.64 | 2.04 | 2.06 | 3.0 | 50.06 | 5.14/77.41 | ChemTherMePulp |
| 40-36-3(160) | 6.03 | 2.00 | 2.02 | 3.0 | 50.00 | 6.40/79.70 | ChemTherMePulp |
| 40-36-4(161) | 8.04 | 2.03 | 2.04 | 3.0 | 50.12 | 8.13/80.73 | ChemTherMePulp |
| 40-36-5(162) | 11.34 | 2.03 | 2.02 | 3.0 | 50.08 | 11.94/89.30 | ChemTherMePulp |
| 40-36-6(163) | 18.16 | 2.02 | 2.06 | 3.0 | 50.04 | 16.38/81.17 | ChemTherMePulp |
| 40-38-1(164)[f] | 3.59 | 2.00 | 2.05 | 3.0 | 50.08 | 3.84/68.69 | GroundWoodPulp |
| 40-38-2(165) | 4.65 | 2.02 | 2.01 | 3.0 | 50.06 | 4.56/68.37 | GroundWoodPulp |
| 40-38-3(166) | 6.07 | 2.02 | 2.00 | 3.0 | 50.07 | 6.05/74.78 | GroundWoodPulp |
| 40-38-4(167) | 8.05 | 2.00 | 2.01 | 3.0 | 50.00 | 7.02/69.85 | GroundwoodPulp |
| 40-38-5(168) | 11.34 | 2.03 | 2.04 | 3.0 | 50.04 | 10.06/75.24 | GroundWoodPulp |
| 40-38-6(169) | 18.14 | 2.03 | 2.06 | 3.0 | 50.10 | 15.28/75.76 | GroundWoodPulp |
| 40-38-7(170) | 8.05 | 2.02 | 2.00[b] | 3.0 | 50.05 | 7.74/76.63 | GroundWoodPulp |
| 40-50-1(171) | 10.52[c] | 2.03 | 2.05 | 3.0 | 50.03 | 11.34/90.36 | MechanicalPulp |
| 40-50-2(172) | 18.00[d] | 2.04 | 2.03 | 3.0 | 50.02 | 17.80/88.82 | MechanicalPulp |
| 40-50-5(173)[e] | 11.78[c] | 2.02 | 2.05 | 3.0 | 50.02 | 12.73/92.25 | GroundWoodPulp |
| 40-50-6(174) | 18.05[d] | 2.00 | 2.02 | 3.0 | 50.10 | 18.09/90.22 | GroundWoodPulp |

A = Lignin Material weight in grams.
a = This sample was prepared with lignin as well as lignin-containing material in the reaction mixture. The lignin is kraft pine lignin and the sample received 1.00 g of lignin.
b = The calcium chloride added to 40-34-7 and 40-38-7 was fine grain material.
c = This sample was prepared using 1-(4-bromophenyl)ethene, [2039-87-9], as the monomer.
d = This sample was prepared using 1-(4-chlorophenyl)ethene, [1073-67-2], as the monomer.
e = Batch 1
f = Batch 2

The structure of the monomers mentioned in the footnotes of Table 11 are shown below.

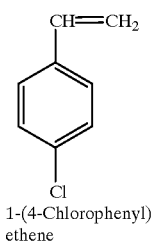
1-(4-Chlorophenyl)ethene

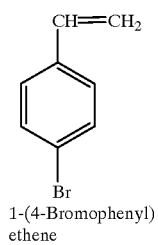
1-(4-Bromophenyl)ethene

The data of Table 11 show that a whole host of monomers can be added to wood; lignin-containing materials; and mixtures of lignin-containing materials and lignin. Note that additional lignin can be added to a reaction on wood to increase the fraction of lignin contained in the reaction. A comparison of the yields of the paired reactions, (40-34-4/40-34-7) and (40-38-4/40-38-7), show that fine grinding of the halide salt added to the reaction increases yield of grafted, lignin-containing material. A comparison of the yields of reactions 40-34-1 to 7 and the yields from groundwood, thermomechanical, and refiner pulp show that pretreatment of the lignin-containing material with sulfite increases yield.

Further, these reactions permanently attach the polymerized monomers to the lignin-containing material, as shown by the data of Table 12. These data show that 48 or more hours of Soxhlet extraction of the grafting reaction product with benzene does not remove much of the polymerized monomer. However, a benzene, Soxhlet extraction of uniform mechanical mixtures of lignin-containing material and poly(1-phenylethylene) under the same experimental conditions removed all of the poly(1-phenylethylene) and left behind the original amount or less of lignin-containing material. Since the homopolymer is benzene soluble, this proves that the product is polymerized monomer bound to the lignin-containing material.

TABLE 12

Weight Increase of Wood Pulp After Reaction with 1-Phenylethene and Extraction with Benzene Reaction Conditions

| A | 36 | 30 | 25 | 20 | 15 | 10 |
|---|---|---|---|---|---|---|
| Monomer, g | 3.5 | 4.7 | 6.0 | 8.0 | 11.3 | 18.0 |

Others: Pulp 2.0 g; $CaCl_2$ 2.0 g; DMSO 50.0 g; $H_2O_2$ (30%) 3.0 mL Reaction Temperature: 30° C.; Reaction Time: 48 h.
Extraction Conditions: Solvent: benzene; Equipment: Soxhlet Apparatus; Extraction Time: 48 h.

Results

| Pulp Type | Weight Increase of Wood Pulp* (g-PS/Pulp) (%) | | | | | |
|---|---|---|---|---|---|---|
| RMP | 1.72 | 7.06 | 7.77 | 10.42 | 36.29 | 38.47 |
| MP | 11.95 | 13.31 | 17.00 | 23.24 | 50.14 | 94.97 |
| CTMP-1 | 9.78 | 16.90 | 22.80 | 37.89 | 47.07 | 79.66 |
| CTMP-2 | 12.47 | 19.04 | 31.22 | 51.78 | 98.74 | 172.39 |
| GWP-1 | 5.99 | 11.60 | 16.25 | 34.60 | 40.30 | 88.25 |
| GWP-2 | 2.09 | 20.75 | 15.69 | 16.50 | 36.28 | 94.56 |

TABLE 12-continued

Weight Increase of Wood Pulp After Reaction with 1-Phenylethene and Extraction with Benzene

| TMP | 0.45 | 9.55 | 11.76 | 33.13 | 55.76 | 134.07 |
|---|---|---|---|---|---|---|
| VHYS | 28.35 | 35.98 | 56.53 | 83.96 | 159.25 | 333.32 |

A = The ratio of wood pulp to (wood pulp + 1-phenylethene).
RMP = Refine mechanical pulp (product number: 40-14-1 to 6)
VHYS = Very high yield bisulfite pulp (product number: 40-34-1 to 6)
MP = Mechanical pulp (product number: 40-26-1 to 6)
TMP = Thermomechanical pulp (product number: 40-32-1 to 6
CTMP-1 = Chemithermomechanical pulp-1 (product number: 40-28-1 to 6)
CTMP-2 = Chemithermomechanical pulp-2 (product number: 40-36-1 to 6)
GWP-1 = Ground wood pulp-1 (product number: 40-30-1 to 6)
GWP-2 = Ground wood pulp-2 (product number: 40-38-1 to 6)
*Weight Increase of Wood Pulp = Wt. of Benzene Insoluble Sidechain/Wt. of Wood Pulp in Reaction Product Also, a comparison of the yield of benzene-insoluble material from samples 40-34-1 to 7 and the yield of insolubles from groundwood, thermomechanical, and refiner pulp listed in Table 17 show that pretreatment of the lignin-containing material with a sulfite solution sharply increases the amount of sidechain permanently bound to the lignin-containing material.

A series of blank reactions were also run. These blank reactions give the following results:

1) In the absence of halide or peroxide added to the reaction, the conversion of monomer was 0.00%. That means that no polymerization nor copolymerization occurred.

2) When no pulp was added to the reaction, the conversion of monomer was very low (16.25%). That means that only a little polymerization occurred.

3) When no 1-phenylethene was added to the reaction, after the oxidation process, the degradation of lignin-containing material was small, and more than 95% of the lignin-containing material could be recovered.

4) The copolymerization must be coinitiated by $H_2O_2$, a halide, and lignin-containing materials.

These copolymers can be used to form any plastic or solid object by injection molding, blow molding, extrusion, vacuum forming, compression molding, transfer molding, sheet casting, reaction injection molding, reinforced reaction injection molding, or related means. Compression molding of samples from Table 16 containing up to 50 weight percent wood pulp gave uniform, opalescent thermoplastic sheets. A compression molding of mixtures of wood pulp and poly (1-phenylethylene) under identical conditions gave clumped, heterogenous sheets. Thus, this grafting process is necessary to produce useful, uniform thermoplastic solids.

Since these copolymers and their polymer blends are malleable when heated, they can be used to make thermoplastic objects. Tests were run on previously synthesized samples of poly(lignin-g-(1-phenylethylene)) to observe its thermoplastic properties. A sample of the graft copolymer or a blend was placed between two teflon sheets and the assemblage placed on top of a hot plate and weighed down with a second hot plate. The lower hot plate was already heated to 167±2° C. and the upper hot plate was already heated to 164±2° C. The copolymer samples were kept between the hot plates for 40 to 60 seconds and then the assemblage was allowed to cool. Pressure was 0.53 MPa. Upon opening the enveloping teflon plates, a hard, brittle sheet was found to have been compression cast from the powdered copolymer or blend. The sheets were clear to opaque, brown plastics with a thickness of approximately 0.5 to 1 mm. The physical properties of the sheet and its color varied according to which copolymer had been chosen for compression casting. All were dark brown and were a darker brown than the powder taken to cast the sheet. The copolymers cast were checked for color and brittleness. The results of the tests are summarized in Table 13. Since the data of Table 12 show that these products contain benzene-soluble, poly(1-phenylethylene) homopolymer, the results of Table 13 show that the grafted lignin-containing material can be mixed with homopolymer of the same structure as the grafted sidechain and mixed, melted, extruded, molded, or blown into solids containing uniformly dispersed lignin-containing material. Once the lignin-containing material is reacted, it can be blended into any polymer with the same structure as its attached sidechain in any amount or proportion. Blending is best done using a single-screw or twin-screw extruder to extrude pellets for later reforming into articles using rolling operations such as calendering or coating; stretching operations such as fiber spinning, film stretching, film casting, or film blowing; or cyclic processes such as injection molding, thermoforming, or blow molding. If the blend is to contain structured phases such as wood fibers, care must be taken in all blending operations to avoid breaking or crushing the structured phase. Details of temperature, pressure, mold design, screw design, and mechanics for the blending operations are described in J. R. A. Pearson's text, "Mechanics of Polymer Processing", Elsevier Science Publishing Co., New York, (1985), ISBN 0-85334-308-X. Blends with other polymers can readily be made with the best blends being those in which the grafted sidechain and the other polymer match in solubility parameter to within plus or minus 2 units. Solubility parameter is calculated from a substance's heat of vaporization to a gas at zero pressure, E, and its molar volume, V=the amount of space taken up by one mole of the material. Solubility parameter is the square root of heat of vaporization divided by molar volume, $S=(E/V)^{0.5}$.

The pure lignin sample, 1-134-4, was the kraft pine lignin used as a reagent in a number of the grafting reactions previously described. Poly(1-phenylethylene) was Amoco RIPO and was used as a comparison material. Examination of the Table 13A films by eye and twisting the films to break them were used to rank the materials for tint and stiffness. The results clearly show that the lignin graft copolymer is a more ductile and thermoplastic material than the starting lignin. Examples 181 to 186 were formed at 150° C., 0.84 MPa pressure, and 2 minutes of compression time. For examples 187 to 190, the temperature was reduced to 125° C. The blends were made by first pressing a film of copolymer and a film of Amoco RIPO poly(1-phenylethylene). The two films were then overlapped and pressed together. While the composite film was still hot, it was rolled into a lump and compressed into a film again. This mixing process, intended to mimic the intense mastication of an extruder or injection molding screw, was repeated three more times until the film was uniform. The films were more ductile and less brown than the pure copolymer film. The films formed at lower temperature were also less brown than those formed at 150° C. Degradable, blended materials of this type can be made from any mixture containing between 0 and 100 percent copolymer reaction product and 0 to 99.9 percent polymer or plastic, preferably with any polymer which forms a miscible polymer blend with the sidechain formed in the copolymerization but most preferably with the polymer or plastic which is the sidechain formed in the copolymerization reaction.

These materials will only be useful if these properties are appropriate for new and profitable markets. Such markets exist since these blends are completely biodegradable and therefore would meet a number of governmental and social criteria for application to consumer goods. The degradation properties of the copolymer blends were tested by a research group of the University of Göttingen, Germany. The lignin

TABLE 13

Experiments in Forming Plastic Films from Copolymer.

| A. Sample Number | Lignin, % in Reaction Mixture | Lignin, % in Original Product | Yield (Weight %) | Brittleness And Darkness of Plastic Films |
|---|---|---|---|---|
| 1-134-4(175) | 100. | 100. | — | Maximum |
| 35-105-3A(176) | 46.0 | 50.41 | 91.37 | Great but Decreasing |
| 35-110-3A(177) | 30.0 | 32.17 | 93.09 | Large but Decreasing |
| 35-130-3A(178) | 22.1 | 27.32 | 81.11 | Medium but Decreasing |
| 35-111-1A(179) | 9.68 | 10.30 | 93.98 | Lower and Decreasing |
| Poly(1-phenyl ethylene) (180) | 0.0 | 0.0 | — | Least |

| B. Sample Number | Weight Used in Film (g) Copolymer Product | Weight Used in Film (g) Amoco Polymer | Final Wt. % Lignin in Film | Copolymer Used to Form the Film |
|---|---|---|---|---|
| 40-64-10(181) | 1.00 | 1.41 | 10 | 35-102-1A |
| 40-64-11(182) | 1.00 | 0.63 | 20 | 35-112-2A |
| 40-64-12(183) | 1.00 | 2.27 | 10 | 35-112-2A |
| 40-64-13(184) | 1.00 | 0.69 | 30 | 35-131-1A |
| 40-64-14(185) | 1.00 | 1.54 | 20 | 35-131-1A |
| 40-64-15(186) | 1.00 | 4.08 | 10 | 35-131-1A |
| 40-64-16(187) | Pure Reaction Product | | 10.32 | 30-100-4A |
| 40-64-17(188) | Pure Reaction Product | | 10.42 | 30-105-2A |
| 40-64-18(189) | Pure Reaction Product | | 15.83 | 30-144-3A |
| 40-64-19(190) | Pure Reaction Product | | 24.13 | 30-102-1A | control was a kraft pine lignin, 1-1 34-4, used to synthesize the copolymers and the poly(1-phenylethylene) control was Amoco RIPO poly(1-phenylethylene) homopolymer pellets. The polymer samples were incubated with one of four fungi on either liquid or solid cultures for up to 68 days. The fungi used in this work were Basidomycete: white rot *Phanerochaete chrysosporium, Trametes versicolor* and *Pleurotus ostreatus*. The activity of the white rot fungi were compared with brown rot fungus *Gloeophyllum trabeum*. Three of these fungi are white-rot species that attack and degrade woody materials by catabolic activity while the fourth fungus is a brown-rot that acts as a negative control since it attacks woody materials by cellulase activity. Amoco RIPO poly(1-phenylethylene) pellets were used as a synthetic polymer control and were not degradable under these tests.

Figure 4A:
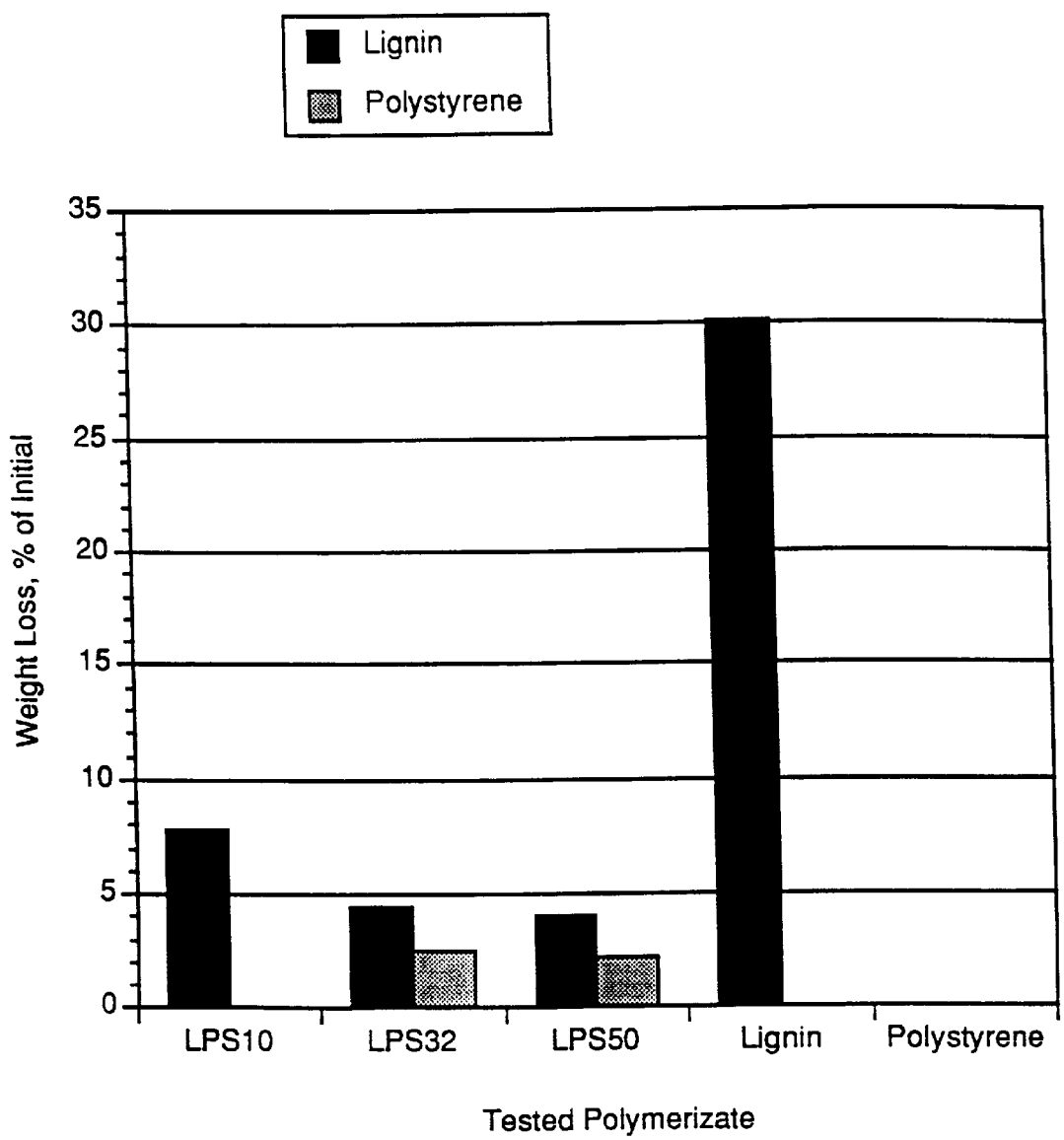
FIGS. 4A, B, C, and D are bar graphs of weight loss for each constituent of a blend of grafted, lignin containing material and a synthetic homopolymer after 68 days of incubation with four fungi.
Figure 4B:
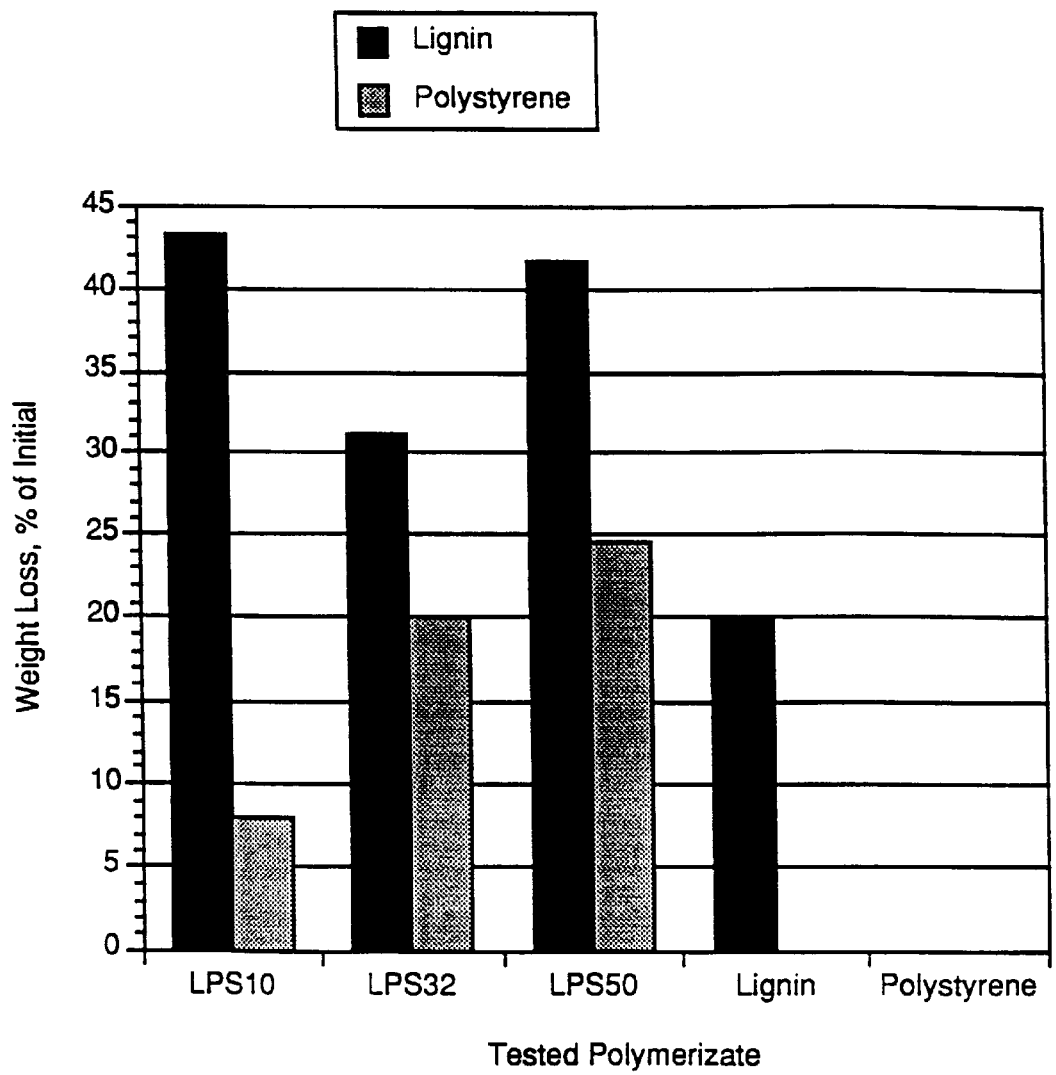
FIG. 4B shows the constituent loss after incubation with *Pleurotus ostreatus*.
Figure 4C:
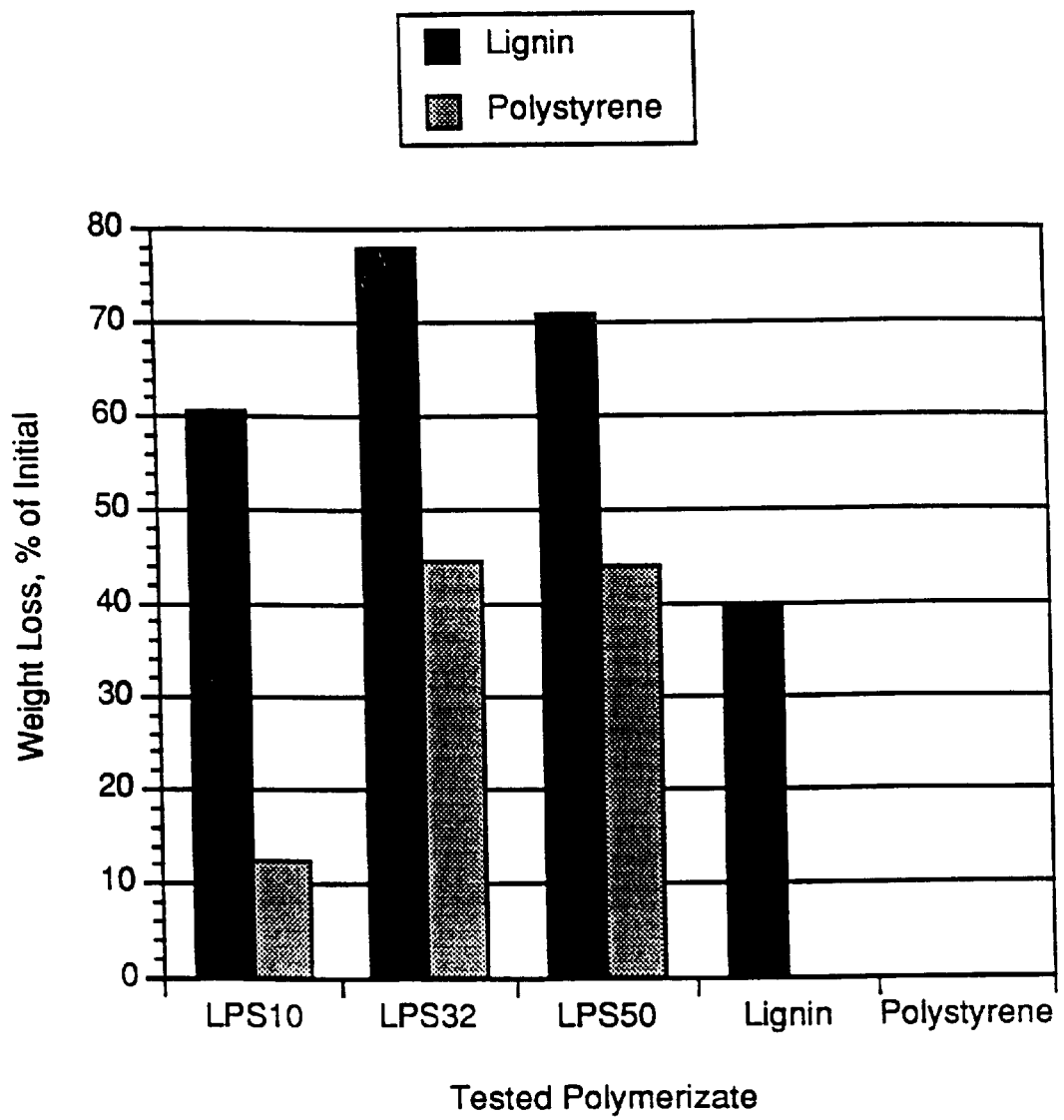
FIG. 4C shows the constituent loss after incubation with *Phanerochaete chrysosporium*.
Figure 4D:
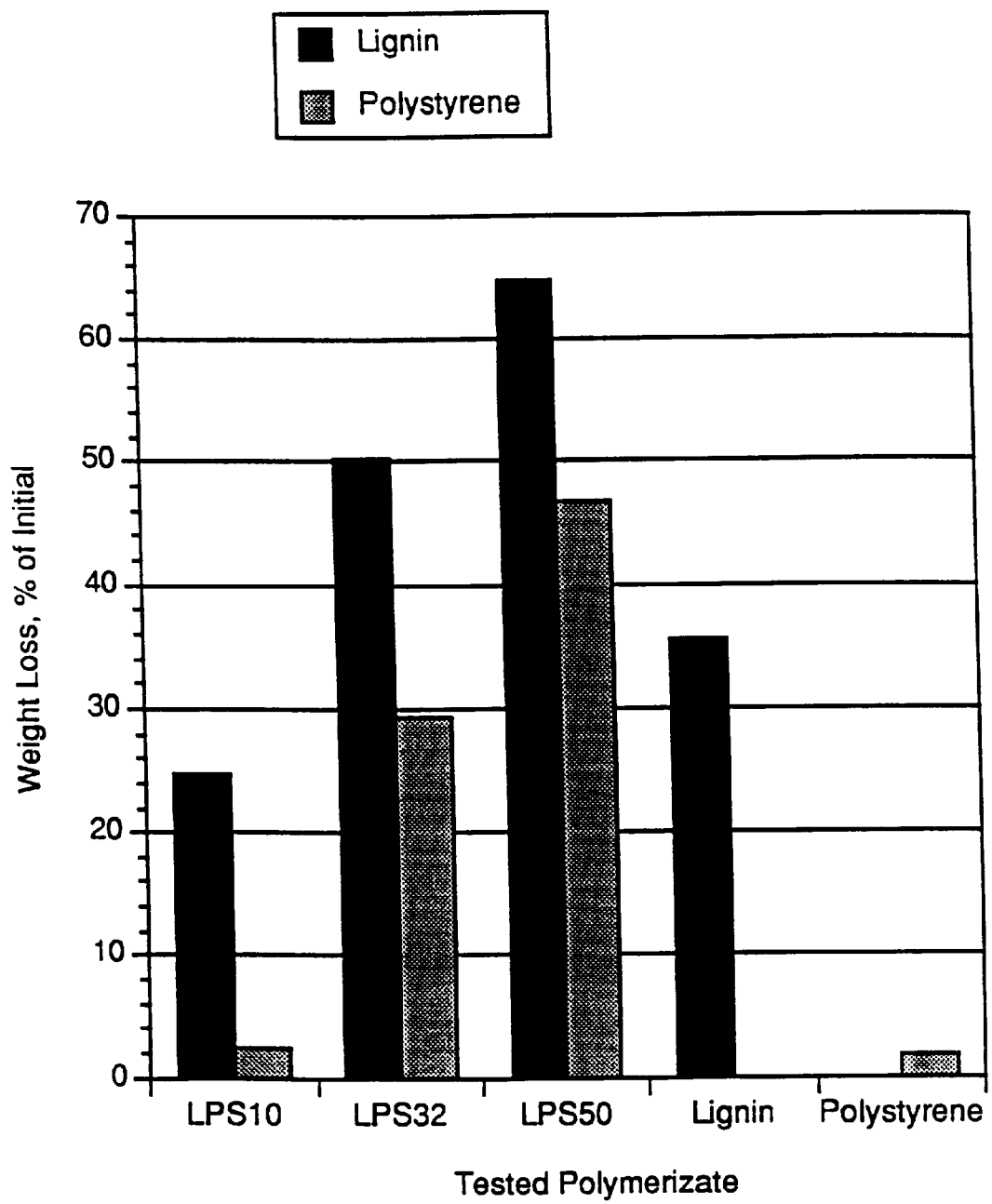
FIG. 4D shows the constituent loss after incubation with *Trametes versicolor*.

Copolymer-homopolymer blends were degraded and the rate of their degradation was correlated with the lignin content of the copolymer. The three copolymers used in these tests were 30-111-1 (Example 88), 35-110-3 (Example 90), and 35-105-3 (Example 89). The sample based on 30-111-1 contained 10.3 percent lignin and at least 50 percent poly(1-phenylethylene) homopolymer. The sample based on 35-110-3 contained 32.1 percent lignin and at least 25 percent homopolymer while the sample based on 35-105-3 contained 50 percent lignin and at least 20 percent homopolymer. The three blends were labeled by the material label "LPS", which stands for lignin-polystyrene, and the weight percent lignin in the sample. This labeling system then gave the labels: 30-111-1 (Example 88) used in LPS10, 35-110-3 (Example 90) used in LPS32, and 35-105-3 (Example 89) used in LPS50. The amount of lignin and poly(1-phenylethylene) missing from the copolymer samples after 68 days of incubation with the 4 fungi is shown in FIG. 4A, 4B, 4C, and 4D. FIG. 4A shows the amount of lignin and polystyrene missing (weight loss) after incubation of the blend with the brown rot fungus *Gloeophyllum trabeum*. FIG. 4B shows the amount of lignin and polystyrene missing after incubation of the blend with the white rot fungus *Pleurotus ostreatus*. FIG. 4C shows the amount of lignin and polystyrene missing after incubation of the blend with the white rot fungus *Phanerochaete chrysosporium*. FIG. 4D shows the amount of lignin and polystyrene missing after incubation of the blend with the white rot fungus *Trametes versicolor*. The white-rot fungi degraded both the lignin and the poly(1-phenylethylene) in the blend with the extent of the degradation increasing with increases in lignin content.

Evidence of bioconversion and degradation of the copolymers was obtained by nuclear magnetic resonance and infrared spectroscopy of samples before and after degradation and by scanning electron microscopy of fungus-corroded surfaces of the plastics. The electron micrographs of the graft copolymer undergoing an environmental decomposition test with a fungus showed that the fungus enveloped the blended particle and proceeded to consume it. An electron micrograph of a granule of copolymer without exposure to fungi showed a flat, unaltered surface. A 120-fold magnification, electron micrograph of a granule of blend exposed to fungus showed the fungus growing toward and over the blend sample, thus showing an attraction for the blend. An electron micrograph close up (2020x) of the blend's surface after hyphae have grown over it shows obvious pitting under the hyphae. This capacity of a plastic to degrade in the environment without making the plastic from a human food stuff or contaminating it with reactive chemicals is a major advantage for these materials in the consumer plastics market. Separate in vitro experiments detected an active oxygen species which appeared to be superoxide radical during the oxidation of lignin by laccase. The process of decay appears to be ligninase decomposition of lignin in an aerobic atmosphere to produce phenyl or alkyl radicals. These radicals form a decay chain uninhibited by the carbon-carbon bonded copolymer and the polymer phase. Samples without lignin showed no presence of an active oxygen species. The route of degradation of the blends appears to be the cleavage of alkyl aromatics by superoxide radical produced by fungi in the presence of the lignin of the copolymer. Similar degradation studies have been performed on blends of plastic and lignin-containing materials grafted with 2-methyl-2-oxy-3-oxopent-4-ene, [80-62-6].

Ungrafted lignin or lignin-containing materials can be incorporated into the blend to induce two-component, complete biodegradation for the resulting product. The amount of ungrafted lignin or lignin-containing materials should be less than 20 percent of the weight of the product or phase segregation will occur. The separation of the ungrafted phase from the polymer phase, called phase segregation, will produce a brittle, weak plastic. Larger amounts of ungrafted lignin or lignin-containing materials can be incorporated into the product and a product with a larger tensile strength and greater impact strength can be obtained if the ungrafted material is coated with graft copolymer before incorporation into the polymer phase. This type of treatment to create a two-component, degradable solid is described in the discussion of wetting and surface compatibilization.

These data show that the lignin graft copolymers will be degraded by white-rot fungi only, while the plastics from lignin-containing materials such as wood will be degraded by both brown-rot and white-rot fungi. These new materials, composed of at least one grafted, lignin containing material agrafted and thermoplastic parts degradth grafted and thermoplastic parts degrade by attack of ligninolytic organisms under terrestrial conditions and in the presence of oxygen. There is no process to degrade polystyrene, polybutadiene, polypropylene, polyacrylonitrile, or similar, man-made thermoplastics in nature in less than five centuries. However, if a thermoplastic object is made from a grafted, vascular plant part and a thermoplastic polymer and it is exposed to woodpeckers, insects, and marine borers of the kingdom Animalia; Bacteria, Actinomycetes, and Cyanobacteria of the kingdom Monera; and members of the kingdom Fungi under specific conditions, then both the grafted, vascular plant part and the thermoplastic polymer in the object will degrade to humus, assimilated matter in the organisms, and mineralized carbon, hydrogen, oxygen, and nitrogen in a period of a few months to a few years. Thus, a new degradable material has been developed which degrades by a unique and previously unavailable process. The closest prior art of record, U.S. Pat. No. 4,891,404, discloses a product wherein a S or O bond between the synthetic sidechain and the natural backbone of the graft copolymer. The method disclosed here requires a process step for forming carbon-carbon bonds between the materials grafted and the sidechains grafted to those materials. This is neither taught nor fairly suggested by the prior art and conforms with current standards requiring biodegradability of all components of all components of a material, as demonstrated by the data of the above disclosure and FIG. 4. The instant method allows for biodegradability of the synthetic as well as the natural portion of the product to be degraded. This is a highly recognized need in the art and is needed both in materials and as a process.

Since the graft copolymers have two parts of differing structure and composition, they are surface active materials.

This was shown by the capacity of these molecules to form emulsions between incompatible fluid phases and to bond and coat wood surfaces.

Contact angle measurements were used in testing how well the graft copolymer acts as a coupling agent between wood and plastic. When wood is embedded in a plastic phase, the interface between the two phases is a high energy boundary produced when the hydrophilic wood meets the hydrophobic plastic. This attempt to meld two very different phases causes the bonding across the boundary to be weak. A coupling agent that can mesh these two phases together would strengthen wood-plastic composites by making the interface at the wood-plastic boundary stronger. The products made in Tables 1 to 12 are such coupling agents and we tested them by measuring how much the materials changed the contact angle of water on birch wood (*Betula albosinensis septentrionalis*). The dynamic contact angle measurement was based on the Wilhelmy plate technique and was done by Dr. Douglas Gardner of the Division of Forestry, West Virginia State University.

A thin, treated or untreated slab of birch is brought into contact with water and immersed in the water at a rate of 194 microns per second. The force of the liquid meniscus on the wood is measured by a force balance. Since the surface tension of water is known, the contact angle of the water and the wood can be calculated. The treated birch samples were prepared by cleaning the wood surface with a kimwip laboratory towel, weighing the wood strip, placing a 5 or 10 weight percent solution of graft copolymer in dimethylformamide on the wood surface with an eyedropper, spreading the copolymer solution with a glass rod, drying the coated wood for 15 hours in a hood and 2 hours in a room temperature vacuum oven, and storing the strip in a desiccator. Data on the coated wood strips are given in Table 14.

TABLE 14

Coating Results For Birch Strips.

| Sample Number (38-33-) | Graft Copolymer Number (35-) | DMF Solution Concentration (%) | Weight of Coating (g) |
|---|---|---|---|
| 4B(191) | 120-1A | 5 | 0.137 |
| 5(192) | 120-1B | 10 | 0.167 |
| 6B(193) | 120-1Ben. Ex. | 5 | 0.083* |
| 7(194) | 110-3A | 10 | 0.13 |
| 8(195) | 110-3B | 10 | 0.11 |
| 9B(196) | 110-3Ben.Ex. | 5 | 0.10 |
| 14(197) | Lignin(1-134-4) | 10 | 0.13 |
| 13B(198) | PS(35-131-3) | 5 | 0.07* |
| 16C(199) | 78% PS + 22% lignin | 5 | 0.093* |
| 17C(200) | 70% PS + 30% lignin | 5 | 0.087* |

*There are white poly(1-phenylethylene) flakes on the surface of these wood strips. All copolymer-coated samples had smooth, adherent surface coats on them. PS = pure, poly(1-phenylethylene) homopolymer.

The contact angles measured on these treated and untreated birch strips are given in Table 15.

The white flakes of poly(1-phenylethylene) on the surface of the birch strips show that the pure polymer can not wet the wood. While the polymer does change the contact angle of the surface, as shown by the data of Table 15, this is not a functional change. As soon as the surface is contacted or experiences any shear forces, this poly(1-phenylethylene) layer will cleave off. All copolymer-coated samples had smooth, adherent surface coats on them, however, and the copolymer coating changed the contact angle of the wood from water-wet (~50°) to oil-wet (110°). Thus, these copolymers are surface-active, coupling agents which can bind wood to hydrophobic phases such as plastic. This coupling process works best when the wetting agent has been synthesized so that the sidechain attached to the lignin during

TABLE 15

Contact Angle Results For Birch Strips.

| Sample Number (38-33-) | Copolymer Number (35-) | Advancing Contact Angle (°) |
|---|---|---|
| 4B(191) | 120-1A | 107.8 |
| 5(192) | 120-1B | 99.1 |
| 6B(193) | 120-1Ben. Ex. | 114.0 |
| 7(194) | 110-3A | 110.0 |
| 8(195) | 110-3B | 99.1 |
| 9B(196) | 110-3Ben.Ex. | 119.5 |
| 14(197) | Lignin(1-134-4) | 87.2 |
| 13B(198) | PS(35-131-3) | 105.4 |
| 16C(199) | 78% PS + 22% lignin | 107.8 |
| 17C(200) | 70% PS + 30% Lignin | 110.4 |
| 1(201) | Uncoated Blank | 49.6 |
| 2(202) | Uncoated Blank | 52.7 |
| 3(203) | Uncoated Blank | 50.2 | the preparation of the macromolecular, surface active agent has repeat units that are chemically identical to the plastic hydrophobic phase that is to be bound or connected to the lignin-containing material. The coupling process is very functional when the sidechain attached to the lignin during the preparation of the macromolecular, surface active agent forms a miscible polymer blend with the plastic hydrophobic phase that is to be bound or connected to the lignin-containing material. The coupling process works well when the sidechain attached to the lignin during the preparation of the macromolecular, surface active agent and the plastic hydrophobic phase that is to be bound or connected to the lignin-containing material match in solubility parameter to within plus or minus 2 units. Polymers that are preferred blending or binding phases for use in this disclosure can be identified by thermodynamic data or experiment. The thermodynamic datum which identifies polymers which will be miscible with the copolymer surface coat is the Gibbs free energy of mixing, $\Delta G_m$, of the copolymer's sidechain and the polymer enveloping phase. This is determined from $$\Delta G_m = \Delta H_m - T\Delta S_m^c - T\Delta S_m^e,$$

where $\Delta H_m$=the heat of mixing, $\Delta S_m^c$=combinatorial entropy of mixing, and $\Delta S_m^e$=excess entropy of mixing for the copolymer's sidechain and the polymer enveloping phase. If $\phi_2$ is defined as the volume fraction of enveloping polymer phase in a mixture with copolymer sidechain, then the polymer is a preferred enveloping material if $\Delta G_m$ is zero at $\phi_2=1$ or 0 and becomes negative for all values of $\phi_2$ in between. The polymer is miscible with the sidechain and is most preferred if $\Delta G_m$ is monotonically decreasing to a minimum for all $\phi_2$ between 0 and 1. Thermodynamic data show that the preferred enveloping polymer phase for a copolymer with a poly(vinylidene fluoride) sidechain at temperatures below the lower critical solution temperature would be poly(methyl methacrylate), 345° C.; poly(methyl acrylate), 298° C.; poly(ethyl methacrylate), 210° C.; poly (vinyl methyl ketone), 195° C.; and poly(ethyl acrylate), 160° C. The lower critical solution temperature is the temperature above which phase separation begins between the two polymers, copolymer's sidechain and the polymer enveloping phase. Large numbers of combinations such as those given above are known to anyone skilled in the art of polymer blends and alloys and, therefore, these combinations will not be listed here. Various combinations and the conditions for applying them are contained in the texts, "Polymer Compatibility and Incompatibility, Principles and Practices" Karel Solc, Ed., Harwood Academic Publishers, Chur, Switzerland (1982), ISBN 3-7186 0046-3 and "Polymer Blends and Alloys: Guidebook to Commercial Products." F. Melvin Sweeney, Ed., Technomic Publishing, Lancaster, Pa. (1 988), ISBN 0-87762-566-2.

The binding of plastic to coated lignin-containing material is best done with rolling operations such as calendering or coating; stretching operations such as film casting or film blowing; or cyclic processes such as injection molding or thermoforming. Since the coated product is to contain a structured phase such as wood, care must be taken in all operations to avoid breaking or crushing the structured phase. It is preferred to heat the polymer to or above its glass transition temperature during the binding process. Glass transition temperature is a characteristic temperature point in amorphous polymers at which molecular segments containing 50 or more backbone atoms begin to move. It is tabulated for many polymers in Chapter VI, pages 209+, of the Polymer Handbook, Third Edition, J. Brandrup, E. H. Immergut, Eds., Wiley-lnterscience (1989). Details of temperature, pressure, mold design, screw design, and mechanics for the binding operations are described in J. R. A. Pearson's text, "Mechanics of Polymer Processing", Elsevier Science Publishing Co., New York (1985), ISBN 0-85334-308-X.

The increase in binding between the polymer phase and the lignin-containing materials is proven by the data which follow. This increase in binding between the phases produces a stronger materials with greater tensile strength.

Coating birch wood (*Betula papyrifera*) with lignin-poly (1-phenylethylene) graft copolymerization product increases the binding strength of poly(1-phenylethylene) plastic coatings on the wood. Lap shear strengths increased 56 percent, from 1826 to 2840 kPa, when the wood was coated with a graft copolymer additive containing 51.7 weight percent lignin. Binding was tested by coating the birch with a solution of graft copolymer, drying the wood, injection molding polystyrene onto the surface of the wood, and pulling the polystyrene off the wood surface in a lap shear brace.

The surface active agents were tested as coupling agents by coating copolymer solutions onto birch tongue depressors, made by Solon Manufacturing Company, Solon, Me. 04979. The 1.75 mm thick by 15.4 mm wide by 70 mm long wood sheets were already cut into suitable sizes to match a gated, steel injection mold. The solutions were 10 weight percent lignin graft copolymer in dimethylformamide (DMF) formed at room temperature by stirring until the solid copolymer was completely dissolved. The coating was applied at room temperature by placing 6 drops of sample solution on a weighed wood depressor and spreading it with a glass rod. The coated sheets were dried in a hood, put into a vacuum oven at room temperature for 1 hour, and then weighed. The difference of the weight was considered the weight of the coating sample. Coated sheets were stored in a desiccator at room temperature and 50±5% relative humidity until the preparation of adhesion test samples.

Wood-plastic samples for lap shear adhesion tests were prepared in a Newberry Mini-Jector, Model 50 injection molding machine. The mold was a trapezoidal, steel block by which a 70 mm long supporting handle and a 12 mm wide by 27.5 mm long by 5.9 mm thick, wood-contacting tongue of polystyrene could be molded. The poly(1-phenylethylene) was heated in a cylinder capped with a hydraulic plunger and injected through a drip-free nozzle into the runner and 1.600 mm diameter, hemicylindrical gate. The relative humidity of the wood was 45 percent, cylinder temperature was 288° C., nozzle temperature was 171° C., injection pressure was 3.5 MPa, pressure holding time was 12 seconds, and chilling time was 1 to 2 minutes. The granular polystyrene used in the bonding experiments was Amoco RIPO, an additive-free polystyrene with a number average molecular weight of 100,000; a weight average molecular weight of 285,000; and a zeta average molecular weight of 540,000. The polymer has a softening point of 107° C. and a melt flow index of 1.8 grams in 10 minutes. The adhesion area was measured for each molded specimen after any non-adherent polystyrene flakes at the edges of the wood sheet on the molded specimen were cleared off.

The wood-plastic samples were tested for adhesion by lap shear binding test by placing the injection molded, woodplastic piece in an aluminum holder and mounting the holder in an Instron Tensile Strength Tester(Model 4200). One hand-fastened grip closed on the aluminum tongue of the holder while the other held the wood depressor of the wood-plastic piece. The relative humidity of the room was 50 percent, room temperature was 23° C., and crosshead speed was 2.54 mm/min. The 56 percent increase in adhesion strength is shown by the data of Table 16.

TABLE 16

Adhesion Strength Determination (Summarized Results*)

| Coating Material | Adhesion Strength (kPa) | |
|---|---|---|
| | Value | Stnd. Deviation |
| 35-115-3A (51.70% lignin) (204) | 2888 | 61 |
| 35-115-3B (205) | 2770 | 335 |
| 35-115-3Ben.Ex. (206) | 2754 | 72 |
| 50% Lig. + 50% PS(207) | 1875 | 93 |
| Polystyrene (208) | 2076 | 210 |
| Lignin (209) | 2160 | 167 |
| Blank (treated with DMF) (210) | 2057 | 123 |
| Blank (treated with nothing) (211) | 1857 | 168 |

*All breakage occurred at the interface of the polystyrene tongue and the wood.

Further examples of materials which can be made to create these degradable materials are given as examples 212 to 215.

Example 212

A grafted product may be made from a plant part from virtually any plant and 1-chloroethene. The structure of 1-chloroethene is:

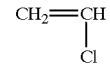

The monomer or a mixture of this monomer and any other ethene monomer mentioned herein can be polymerized with any plant part in any one of a series of solvents by dispersing the plant part and any of a series of metal halide salts, with calcium chloride the preferred salt, in the solvent. Typical solvents are listed in Table 1 and typical salts are listed in Table 4. Other solvents and salts can be used. The polymerization is initiated by adding a hydroperoxide to the reaction mixture and representative hydroperoxides are listed in Table 3. The monomer, 1-chloroethene, is added to the reaction mixture either as a cooled liquid or as an ambient temperature gas and the reaction is allowed to proceed for between 1 and 96 hours, 48 hours preferred, with stirring at a rate of 0.93 Hz. The gaseous monomer may be added by bubbling. The polymer is recovered by precipitation in non-solvents or evaporation of solvent. The structure of the product is:

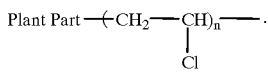

Syndiotactic, isotactic, or atactic bonds through the 1-chloroethene monomer unit are possible.

Polymerizations of 1-chloroethene were run in a 1 m long, heavy walled, glass tube. The mixed lignin, calcium chloride, and dimethylsulfoxide was placed in the tube and saturated with nitrogen. It was frozen in dry ice. The 1-chloroethene was condensed in a 10 cm long, side arm using liquid nitrogen as coolant before a 30 volume percent solution of hydrogen peroxide in a glass vial was placed on the frozen dimethylsulfoxide solution. The glass tube reactor was evacuated, sealed, and rotated once the dimethylsulfoxide solution had thawed. The amount of lignin added to the reaction was 2.0 g and the amount of 1-chloroethene was approximately 4.5 g (measured by volume, not by weight). Over 48 hours, the reaction mixture thickened and a gelatinous solid formed in the tube. The solid recovered from the tube did not dissolve in 2M aqueous base, a common and powerful solvent for lignin. Since thermoplastic lignin with a poly(1-chloroethylene) sidechain would not be soluble in any aqueous solution, this was strong proof of graft copolymerization of this gaseous monomer.

Ethyne and substituted ethynes may be used alone or in combination with ethenes to form a graft copolymer. The process of forming the ethyne-based copolymer product of a vascular plant is illustrated by Examples 213, 214, and 215. Products also containing repeat units from ethene monomers can be formed by replacing some of the ethyne with the appropriate ethene.

Examples 213, 214, and 215.

In these examples, 1-phenylethyne is used in Example 213, 1-chloroethyne is used in Example 214, and 1-bromoethyne is used in Example 215. A grafted product may be made from a plant part from virtually any plant and 1-phenylethyne, 1-chloroethyne, and/or 1-bromoethyne. The structures of 1-phenylethyne , 1-chloroethyne, and 1-bromoethyne are,

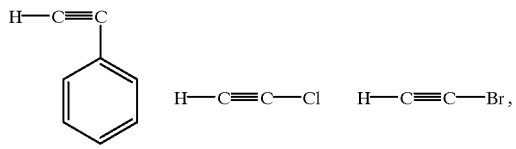

respectively. The monomer or a mixture of this monomer and any other ethene monomer mentioned herein can be polymerized with any plant part in any one of a series of solvents by dispersing the plant part and any of a series of metal halide salts, with calcium chloride the preferred salt, in the solvent. Typical solvents are listed in Table 1 and typical salts are listed in Table 4. Other solvents and salts can be used. The polymerization is initiated by adding a hydroperoxide to the reaction mixture and a representative group of hydroperoxides is listed in Table 3. The liquid monomer, 1-phenylethyne, is added to the reaction mixture and the reaction is allowed to proceed for between 1 and 96 hours, 48 hours preferred, with stirring or agitation. The gaseous monomer, 1-chloroethyne or 1-bromoethyne, is added to the reaction mixture either as a cooled liquid or as an ambient temperature gas and the reaction is allowed to proceed for between 1 and 96 hours, 48 hours preferred, with stirring or agitation. The gaseous monomer may be added by bubbling. The polymer is recovered by precipitation in non-solvents or evaporation of solvent.

The structure of the product is:

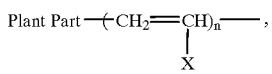

where X is a phenyl (213), chloro(214), or bromo group (215). Cis, trans, syndiotactic, isotactic, or atactic bonds through the substituted ethyne monomer unit are possible.

Having now fully described the invented materials, it will be apparent to one of ordinary skill in the art that many changes and modifications can be made thereto without departing from the spirit or scope of the invention as set forth herein.

We claim:

1. A method for preparing a biodegradable composite which includes
   (i) a material containing grafted lignin having repeat monomer units, $R_u$, grafted to the lignin and
   (ii) a polymer,
   both the grafted lignin and the polymer being biodegradable, comprising:
   a) free radically graft copolymerizing a substituted ethene or ethyne polymerizable by free radical polymerization on lignin by connecting a carbon atom of substituted ethene or ethyne to a carbon atom of the lignin aromatic ring or to a carbon bonded by one or more carbon bonds to the aromatic ring to thereby form the material containing the grafted lignin having repeat monomer units, $R_u$, grafted to a backbone of lignin, the substituted ethene being selected from the group consisting of

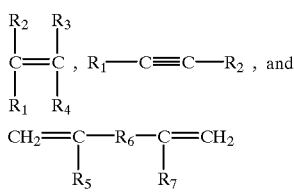

and mixtures thereof where $R_1$ through $R_7$ each designate an organic or inorganic functional group which does not interfere with free radical polymerization and is selected from the group consisting of:
   (1) hydrogen;
   (2) a halogen;
   (3) the group consisting of an organic acid, an organic alcohol, an aldehyde, an alkane, an alkene, an alkyne, an amide, an aromatic, a cycloalkane, an ester, an ether, an organic halogen, a ketone, an organic nitrile, a phenol, an organophosphate, and an organic sulfonic acid;
   (4) the group specified at (3) substituted in at least one carbon atom by a heteroatom with the atomic symbol S, Se, Te, N, P, As, Sb, Bi, Si, Ge, Sn, Pb, or B; and (5) the groups specified at (3) and (4) further substituted by members of the groups specified at (3) and (4), and the polymer is a macromolecule containing 25 to 500,000 repeat units connected one to another; and then b) mixing the material containing the grafted lignin with the polymer both the material containing the grafted lignin and the polymer thereby becoming biodegradable; the polymer being at least one selected from the group consisting of: main-chain acyclic, carbon polymers; main-chain carbocyclic polymers; main-chain acyclic, heteroatom polymers with —C—O—C— bonding; main-chain acyclic, heteroatom polymers with —C—S—C— and —C—S—N— bonding; main-chain acyclic, heteroatom polymers with —C—N—C— bonding; main-chain heterocyclic polymers; and formaldehyde resins.

2. A method according to claim 1 and further including in step (a), (i) treating the material containing lignin by one of: crushing, grinding, sawing, chipping, barking, pulping, refining, or extraction and; optionally if the lignin is wood, pretreating the wood with an aqueous solution of a sulfite compound and heating; and then forming a suspension of the treated lignin and a solvent or neat monomer, (ii) mixing the suspension to dissolve or disperse the lignin in the solvent or neat monomer and, if the lignin is from a woody plant, mixing until essentially uniform; (iii) adding a halide salt to the suspension; (iv) adding a hydroperoxide or solid peroxide to the suspension; (v) maintaining an inert atmosphere over the suspension; (vi) adding the monomer or monomers to the suspension to form a reaction mixture, thereby initiating free radical polymerization; (vii) continuously stirring the reaction mixture at a rate and for a time sufficient for polymerization reaction; (viii) terminating the reaction; and then (ix) recovering the material containing grafted lignin.

3. A method according to claim 1 and further including between steps (a) and (b), heating the material to at least its glass transition temperature; and heating the polymer to at least its glass transition temperature.

4. A method according to claim 1 and further including after step (b), cooling the mixture to about room temperature.

* * * * *